(12) United States Patent
Natusch et al.

(10) Patent No.: US 11,555,519 B1
(45) Date of Patent: Jan. 17, 2023

(54) CAGE WITH PUMPING VANE AND BEARING INCLUDING CAGE WITH PUMPING VANE

(71) Applicant: Schaeffler Technologies AG & Co. KG, Herzogenaurach (DE)

(72) Inventors: Karl Michael Natusch, Davidson, NC (US); William Kendall Davis, York, SC (US); Scott Hart, Sharon, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/382,656

(22) Filed: Jul. 22, 2021

(51) Int. Cl.
*F16C 33/66* (2006.01)
*F16C 33/41* (2006.01)
*F16C 33/38* (2006.01)

(52) U.S. Cl.
CPC ...... *F16C 33/6681* (2013.01); *F16C 33/3887* (2013.01); *F16C 33/418* (2013.01)

(58) Field of Classification Search
CPC . F16C 33/3887; F16C 33/418; F16C 33/6681
See application file for complete search history.

(56) References Cited

U.S. PATENT DOCUMENTS

| 11,131,344 B1* | 9/2021 | Roffe | F16C 33/3875 |
| 2016/0319872 A1* | 11/2016 | Price | F16C 33/6677 |
| 2019/0264744 A1* | 8/2019 | Lin | F16C 33/3887 |

\* cited by examiner

*Primary Examiner* — Alan B Waits
(74) *Attorney, Agent, or Firm* — Volpe Koenig

(57) ABSTRACT

A cage for a bearing, including: a first annular segment; a second annular segment located radially inwardly of the first annular segment; a vane connected to the first annular segment and to the second annular segment and including a first axial end facing at least partly in a first axial direction parallel to an axis of rotation of the cage and a second axial end facing at least partly in a second axial direction, opposite the first axial direction, the second axial end off-set from the first axial end in a circumferential direction around the axis of rotation; and a curved surface connected to the first annular segment and the second annular segment and arranged to retain a ball of the bearing. The first annular segment, the second annular segment, the vane, and the curved segment define a channel passing through the cage.

20 Claims, 22 Drawing Sheets

US 11,555,519 B1

CAGE WITH PUMPING VANE AND BEARING INCLUDING CAGE WITH PUMPING VANE

TECHNICAL FIELD

The present disclosure relates to: a cage with pumping vanes; and a bearing including the cage with the pumping vanes arranged to pump lubricating fluid through the bearing; and a method of operating a bearing including the cage with the pumping vane.

BACKGROUND

In known devices, a bearing can block a circular flow of lubrication fluid through the device. To enable the circular flow a pump must be added, adding to the cost and complexity of the device.

SUMMARY

According to aspects illustrated herein, there is provided a cage for a bearing, including: a first annular segment; a second annular segment located radially inwardly of the first annular segment; a vane connected to the first annular segment and to the second annular segment; and a curved segment connected to the first annular segment and the second annular segment, and arranged to retain a ball of the bearing, wherein the first annular segment, the second annular segment, the vane, and the curved segment define a channel passing through the cage.

According to aspects illustrated herein, there is provided a bearing, including: an outer ring including a radially inwardly facing surface defining a first circumferentially continuous groove; an inner ring including a radially outwardly facing surface defining a second circumferentially continuous groove; a cage radially disposed between the inner ring and the outer ring and including a first annular segment, a second annular segment located radially inwardly of the first annular segment, a vane connected to the first annular segment and to the second annular segment, and a curved segment connected to the first annular segment and the second annular segment; and a ball retained by the curved segment and disposed in the first circumferentially continuous groove and in the second circumferentially continuous groove. The first annular segment, the second annular segment, the vane, and the curved segment define a first channel passing through the bearing.

According to aspects illustrated herein, there is provided a method of pumping a lubricating fluid through a bearing including an inner ring with a first circumferential groove, an outer ring with a second circumferential groove, a cage radially disposed between the inner ring and the outer ring and including a first annular segment, a second annular segment radially inward of the first annular segment, a curved segment and a vane connected to the first annular segment and the second annular segment and including a surface facing in a first circumferential direction around an axis of rotation of the bearing, and a ball disposed in the first circumferential groove and the second circumferential groove, and retained by the curved segment, the method including: rotating the cage in the first circumferential direction around the axis of rotation, or in a second circumferential direction, opposite the first circumferential direction; contacting a lubricating fluid with the surface of the vane; and pumping, with the vane, the lubricating fluid through the bearing via a first channel in the cage, the first channel defined by the first annular segment, the curved segment, the second annular segment, and the surface of the vane.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
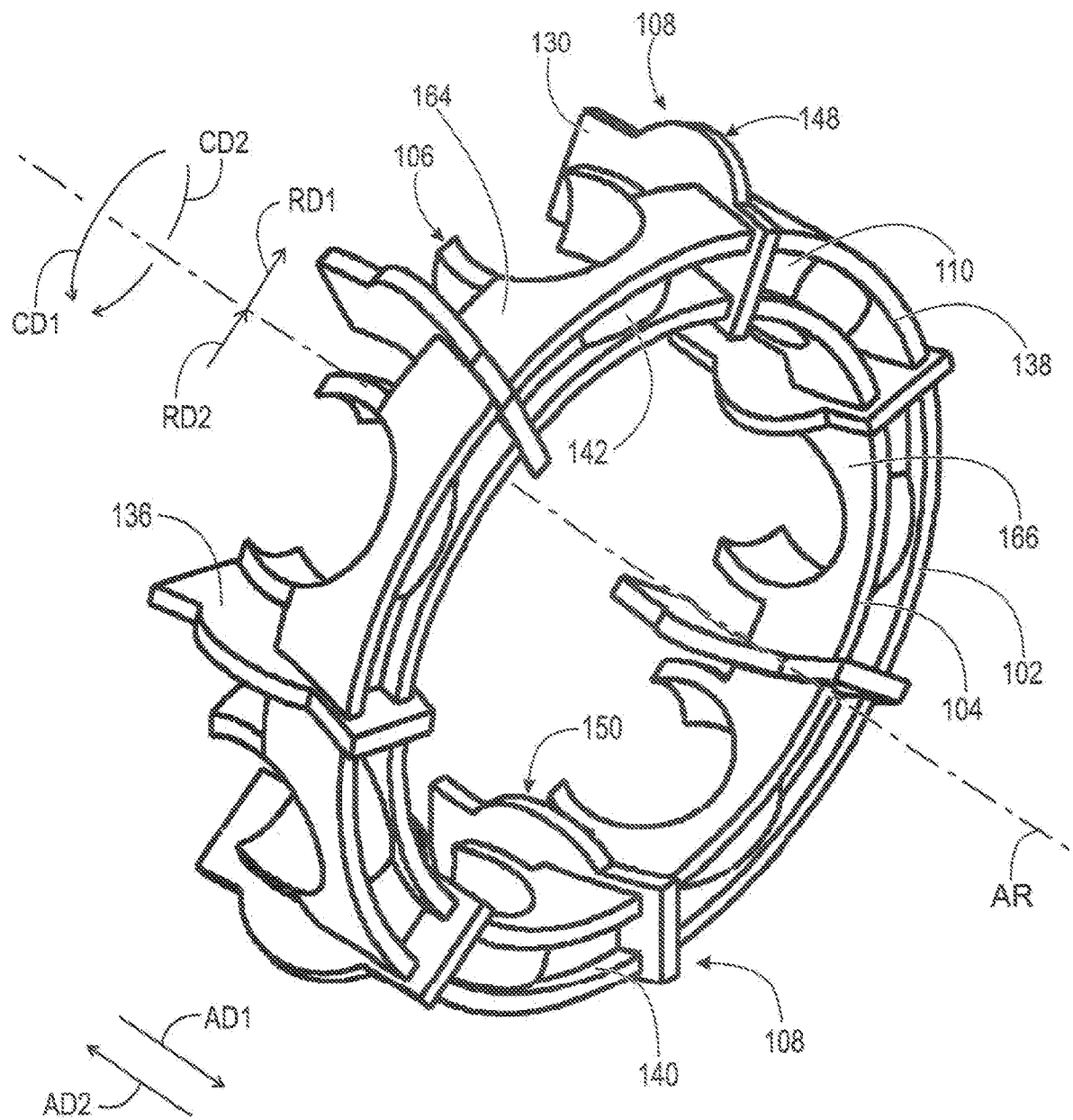
FIG. 1 is an isometric view of an example bearing cage with curved pumping vanes.

FIG. 1 is an isometric view of example bearing cage 100 with pumping vanes having curved surfaces.

Figure 2:
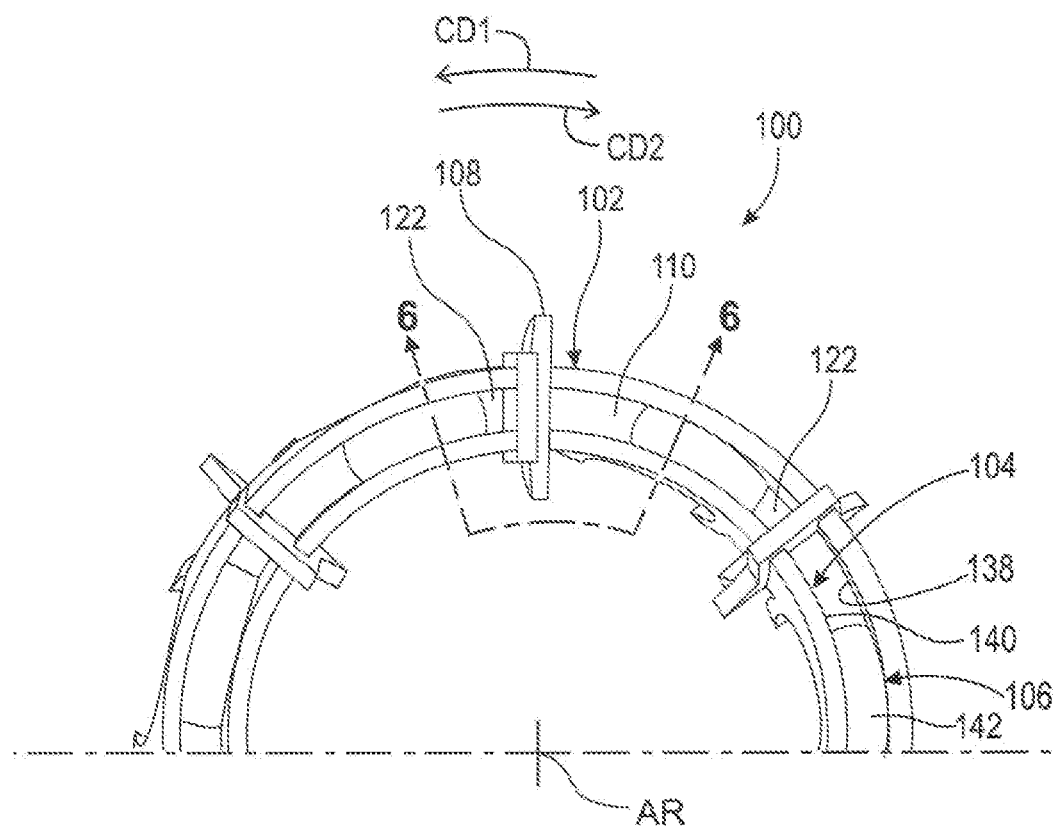
FIG. 2 is a partial front view of the bearing cage shown in FIG. 1.

FIG. 2 is a partial front view of bearing cage 100 shown in FIG. 1.

Figure 3:
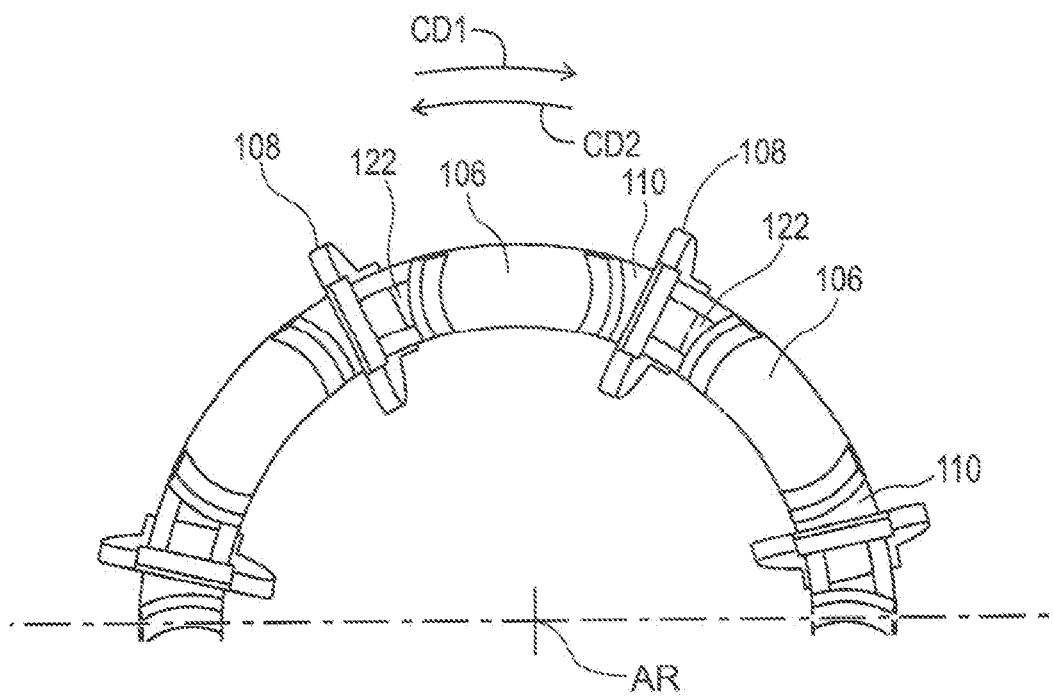
FIG. 3 is a partial back view of the bearing cage shown in FIG. 1.

FIG. 3 is a partial back view of bearing cage 100 shown in FIG. 1.

Figure 4:
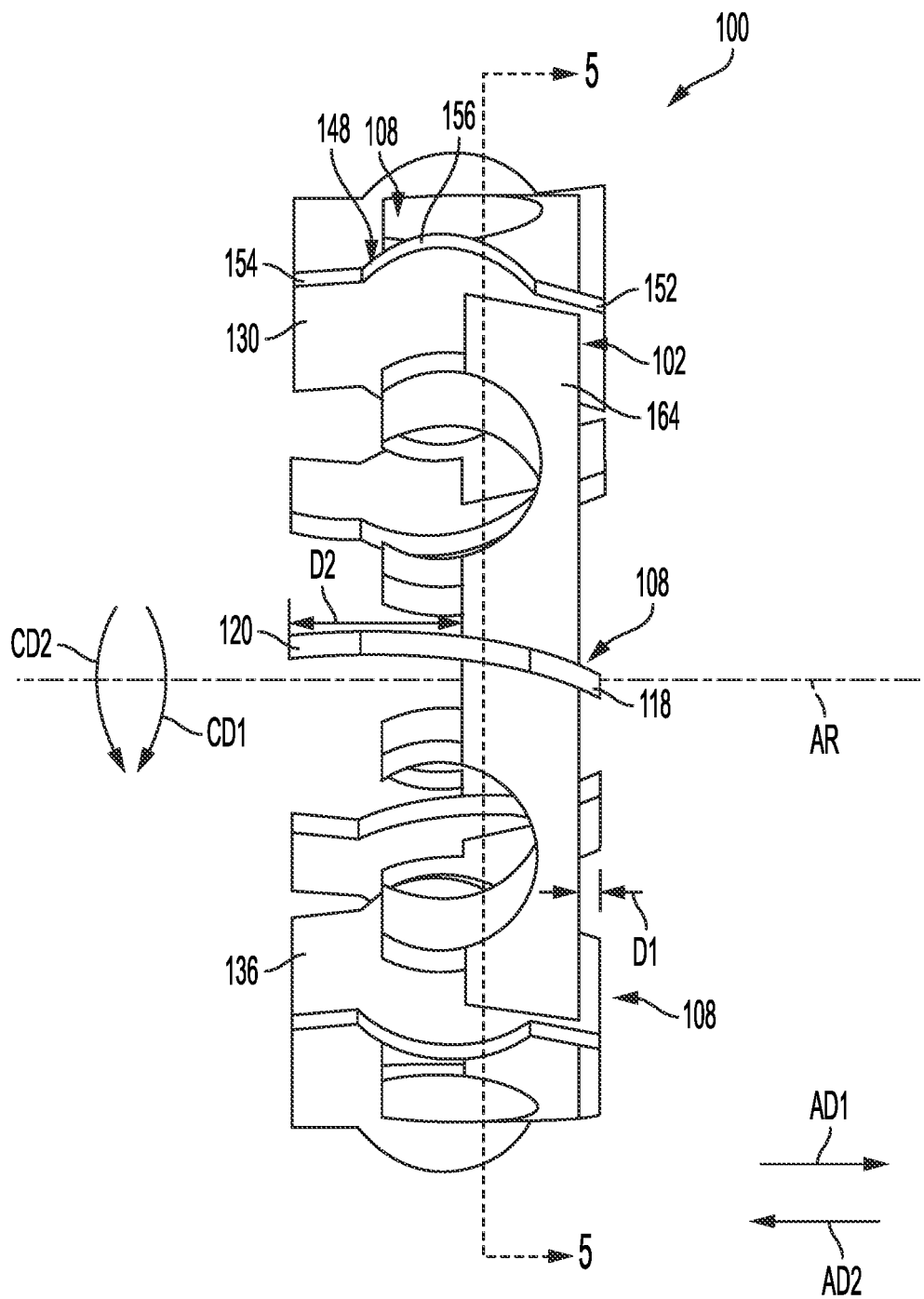
FIG. 4 is a side view of the bearing cage shown in FIG. 1.

FIG. 4 is a side view of bearing cage 100 shown in FIG. 1. The following should be viewed in light of FIGS. 1 through 4. In the example of FIG. 1, bearing cage 100 includes: annular segments 102; annular segments 104 located radially inwardly of segments 102; curved segments 106 arranged to receive and retain balls of a bearing; and vanes 108. In the example of FIG. 1, cage 100 is a single molded piece. By "annular segment" we mean that the segment is in the shape of circular arc centered around axis of rotation AR of cage 100. To clarify the presentation in FIG. 4, the radially outermost surfaces of segment 102, curved segments 106, and vanes 108 have been stippled. In the example of FIG. 1, bearing cage 100 includes blocking walls 110. Each wall 110 is connected to a respective vane 108, a respective segment 102, a respective segment 104, and a respective curved segment 106.

Curved segments 106 and vanes 108 are connected to annular segments 102 and annular segments 104. Each curved segment 106 is radially disposed between a segment 102 and a segment 104. Vanes 108 are circumferentially interleaved with pairs of segments 102 and 104. For example, vanes 108 alternate with pairs of segments 102 and 104 in circumferential direction CD1 around axis AR. Each vane 108 includes: front axial end 118 facing axial direction AD1, parallel to axis AR; and rear axial end 120 facing axial direction AD2, opposite direction AD1. End 118 is off-set from end 120 in circumferential direction CD1 around axis AR. In an example embodiment (not shown), end 118 is off-set from end 120 in circumferential direction CD2.

Each segment 102, a respective segment 104, a curved segment 106 connecting the segments 102 and 104, and a respective vane 108 define a channel 122 passing through cage 100. By "passing through cage 100," we mean channel 122 is open from end 118 to end 120.

In the example of FIG. 1: each vane 108 includes curved surface 130 curved along axial directions AD1 and AD2; and surfaces 130 face at least partly in circumferential direction CD1. Thus, surface 130 is non-planar and forms a concave shape facing in direction CD1. Each vane 108 includes surface 136 facing in direction CD2, opposite direction CD1. In the example of FIG. 1, surface 136 forms a convex shape facing in direction CD2. It is understood that cage 100 is not limited to curved surfaces 130 facing direction CD1 and curved surfaces 136 facing direction CD2. In an example embodiment (not shown) curved, concave surfaces 130 face in direction CD2 and curved, convex surfaces 136 face in direction CD1. In an example embodiment (not shown), surface 136 is planar.

Figure 5:
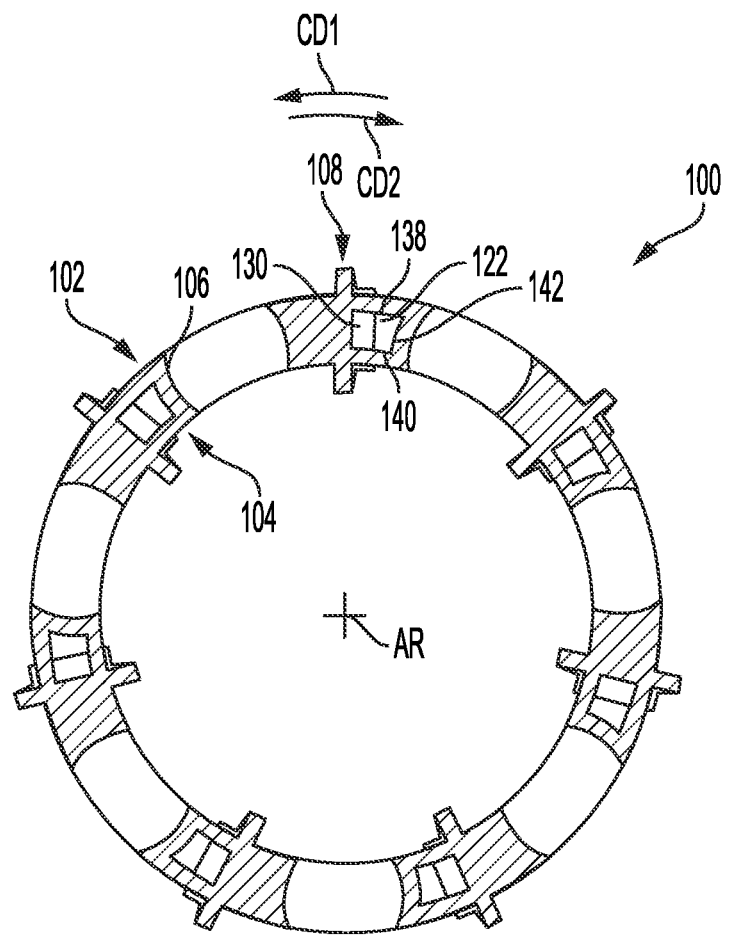
FIG. 5 is a cross-sectional view generally along line 5-5 in FIG. 4

FIG. 5 is a cross-sectional view generally along line 5-5 in FIG. 4. The following should be viewed in light of FIGS. 1 through 5. Each segment 102 includes surface 138 facing radially inwardly. Each segment 104 includes surface 140 facing radially outwardly. Each curved segment 106 includes surface 142 facing at least partly in direction CD2. Each channel 122 is defined by a surface 130, a surface 138, a surface 140, and a surface 142. In the example of FIG. 1, each channel 122 is defined solely by the surface 130, the surface 138, the surface 140, and the surface 142.

In the example of FIG. 1: axial ends 118 of vanes 108 extend past segments 102 and 104 by distance D1 in axial direction AD1; axial ends 120 extend past segments 102 and 104 by distance D2 in direction AD2; and distances D1 and D2 are different. In the example of FIG. 1, distance D2 is greater than distance D1.

Figure 6:
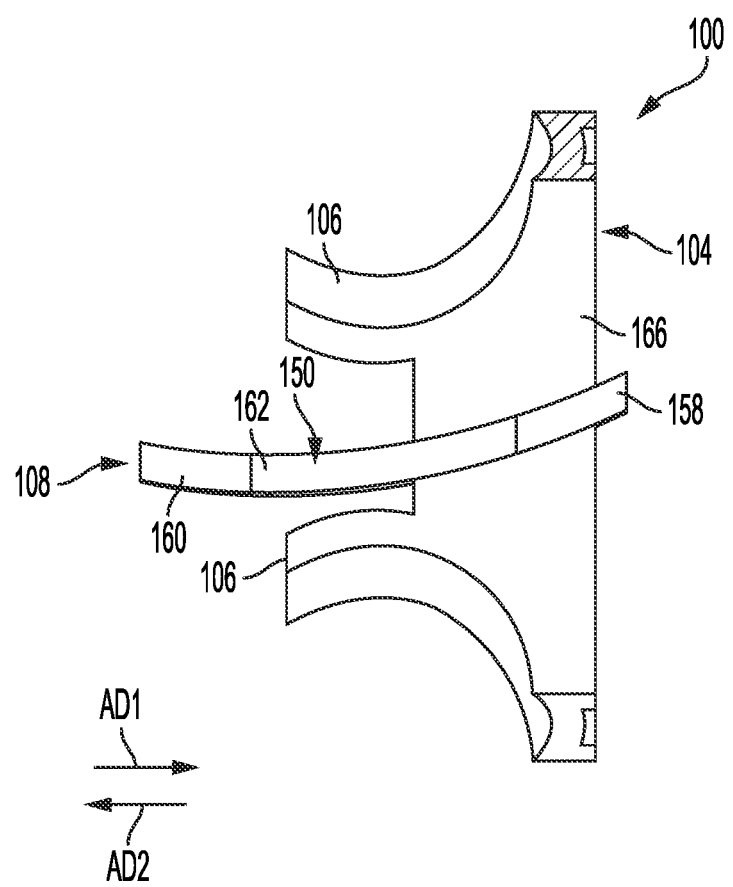
FIG. 6 is a radially inner view defined by line 6-6 in FIG. 2.

FIG. 6 is a radially inner view defined by line 6-6 in FIG. 2. The following should be viewed in light of FIGS. 1 through 6. In the example of FIG. 1: surfaces 148 of vanes 108 are located past annular segments 102 in radially outer direction RD1; and surface 150 of vanes 108 are located past annular segments 104 in radially inner direction RD2, opposite direction RD1. Each surface 148 includes: segment 152, segment 154, and segment 156 bracketed by segments 152 and 154 and connecting segments 152 and 154. Segment 156 extends past segments 152 and 154 in direction RD1. In the example of FIG. 1, segment 156 forms at least one smooth curve extending radially outwardly. Each surface 150 includes: segment 158, segment 160, and segment 162 bracketed by segments 158 and 160 and connecting segments 158 and 160. Segment 162 extends past segments 158 and 160 in direction RD2. In the example of FIG. 1, segment 162 forms at least one smooth curve extending radially inwardly.

Figure 7:
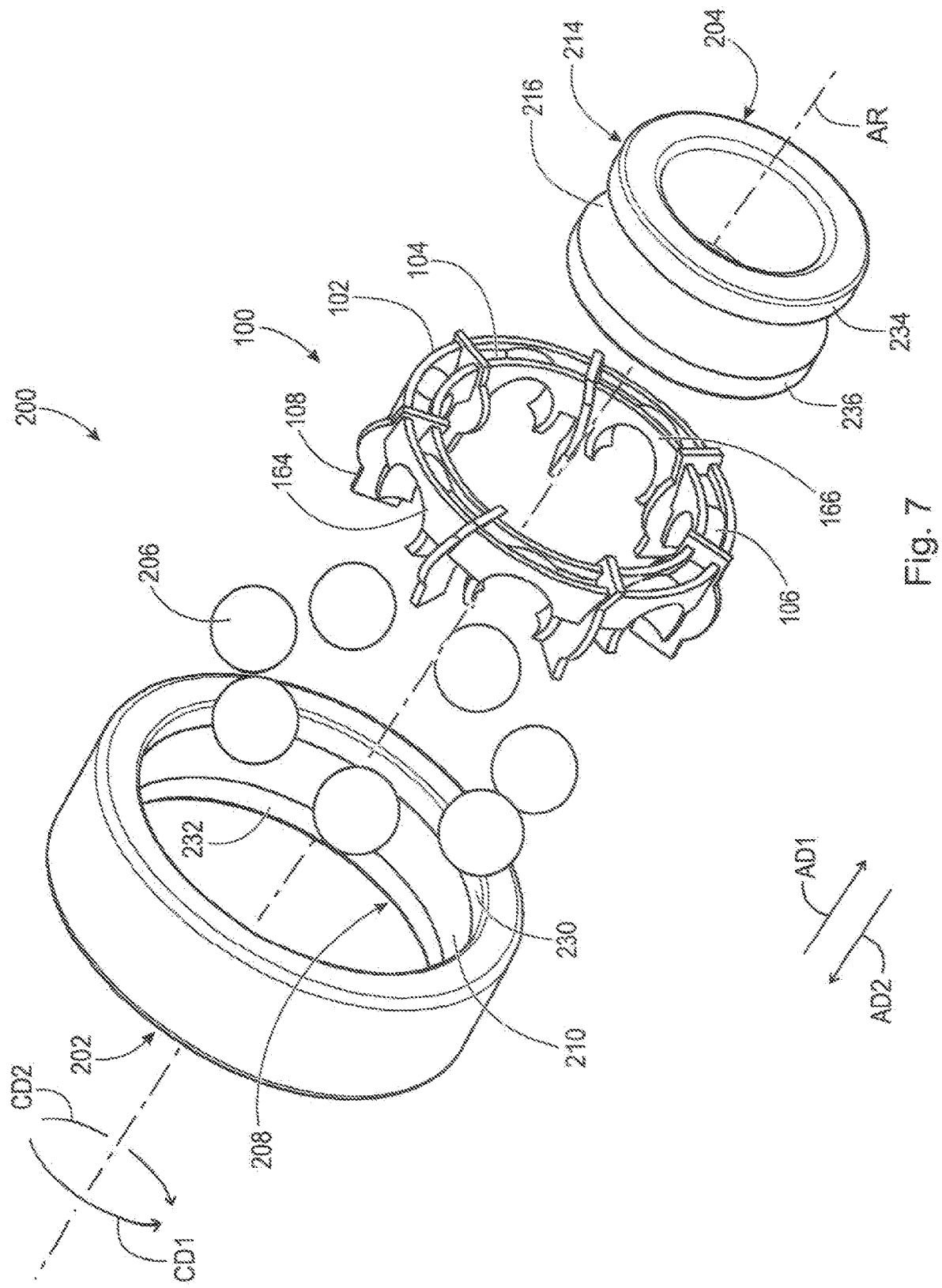
FIG. 7 is an exploded view of an example bearing with the bearing cage shown in FIG. 1.

FIG. 7 is an exploded view of example bearing 200 with bearing cage 100 shown in FIG. 1.

Figure 8:
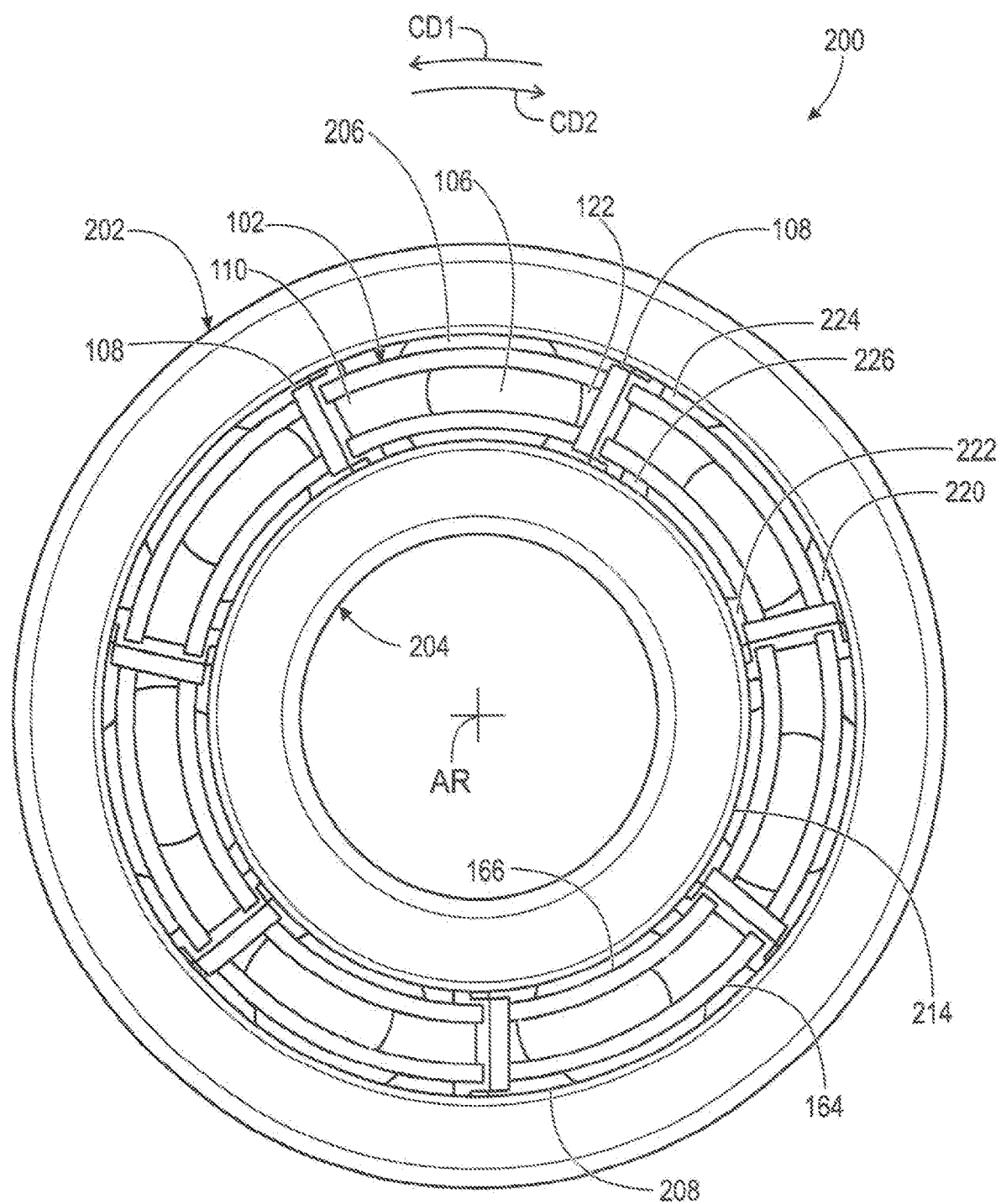
FIG. 8 is a front view of the bearing shown in FIG. 7.

FIG. 8 is a front view of bearing 200 shown in FIG. 7.

Figure 9:
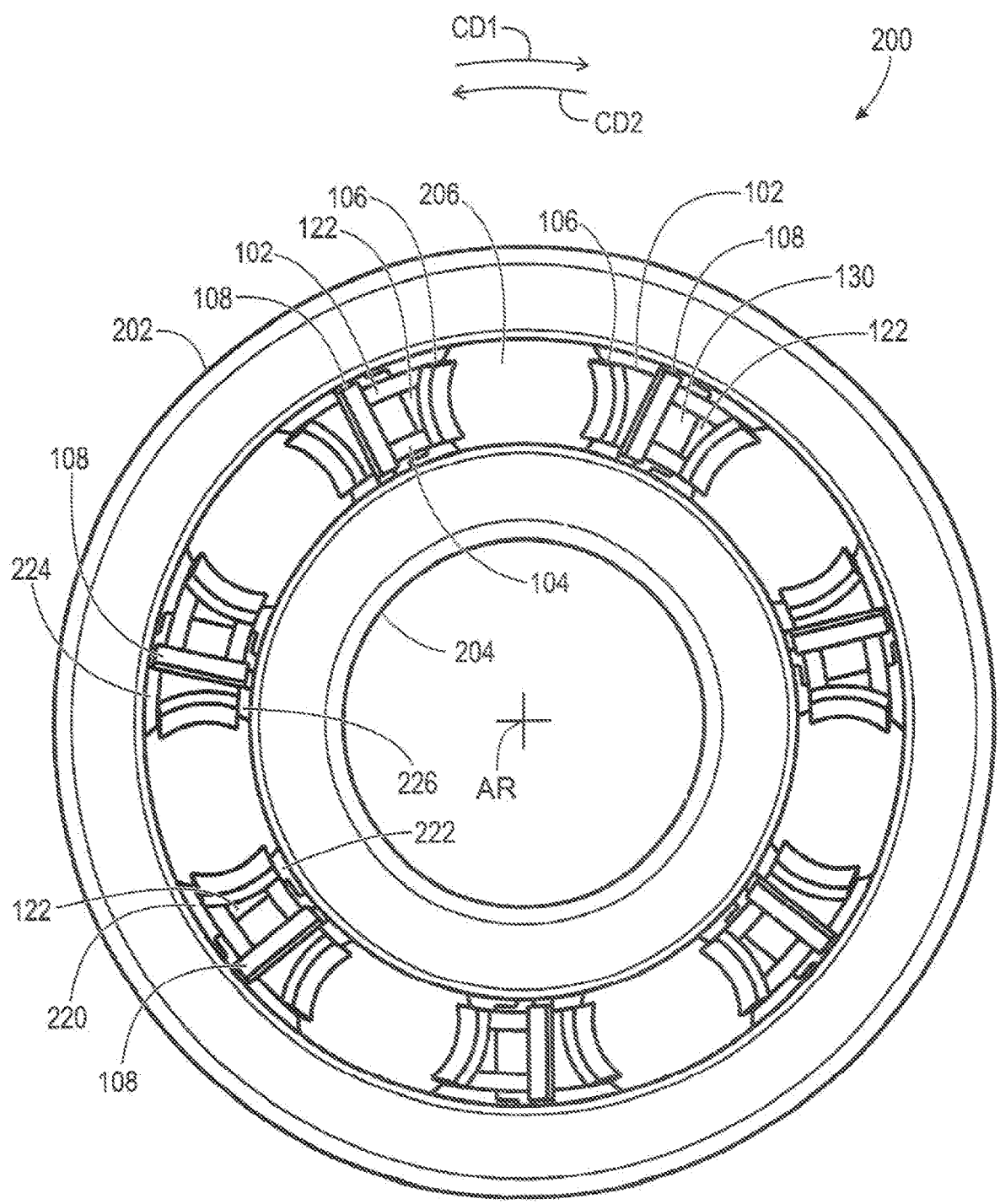
FIG. 9 is a back view of the bearing shown in FIG. 7.

FIG. 9 is a back view of bearing 200 shown in FIG. 7. The following should be viewed in light of FIGS. 1 through 9. Bearing 200 includes: outer ring 202; inner ring 204; cage 100; and balls 206. Cage 100 is radially disposed between inner ring 202 and outer ring 204. Balls 206 are located in and retained by curved segments 106.

Figure 10:
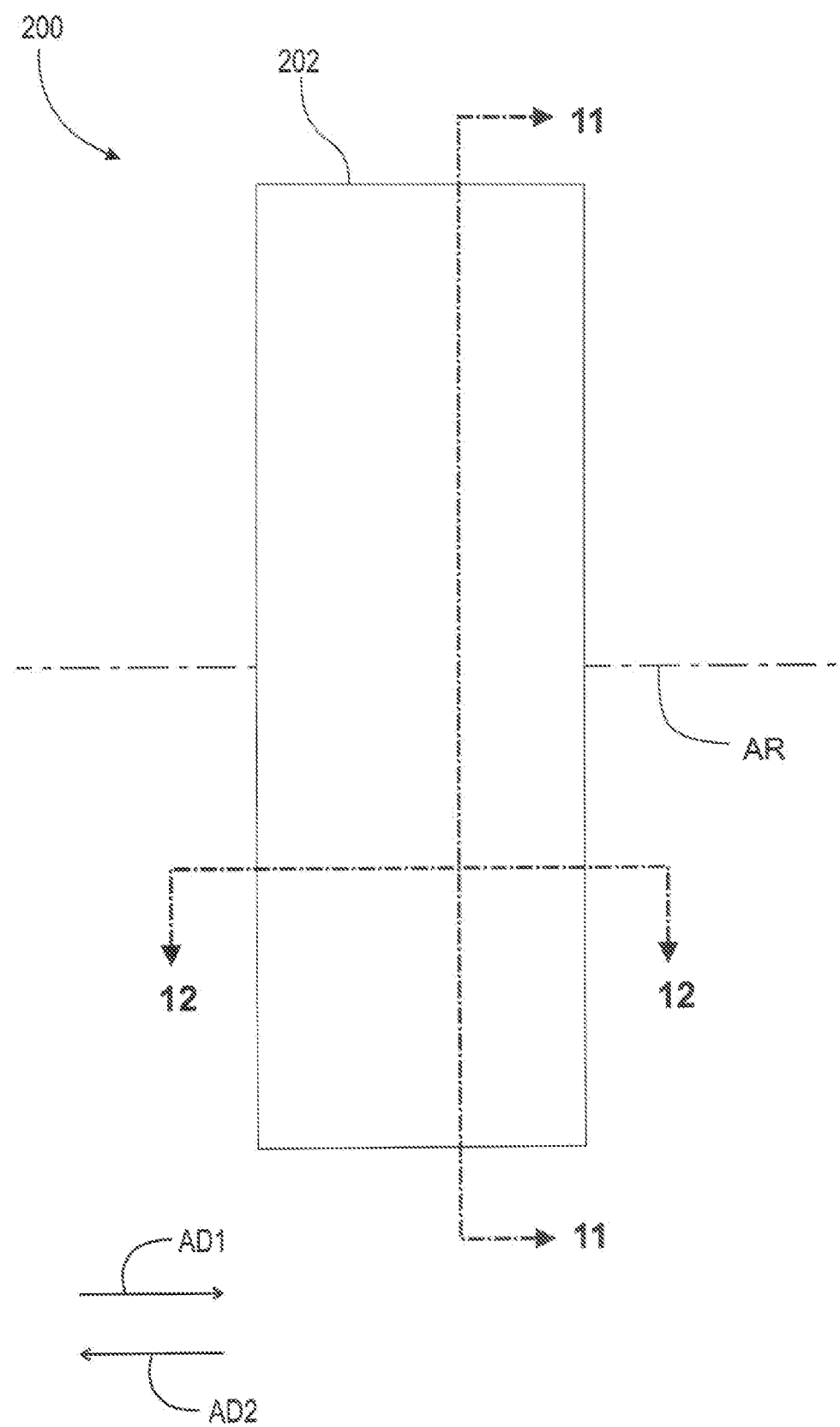
FIG. 10 is a side view of the bearing shown in FIG. 7.

FIG. 10 is a side view of bearing 200 shown in FIG. 7.

Figure 11:
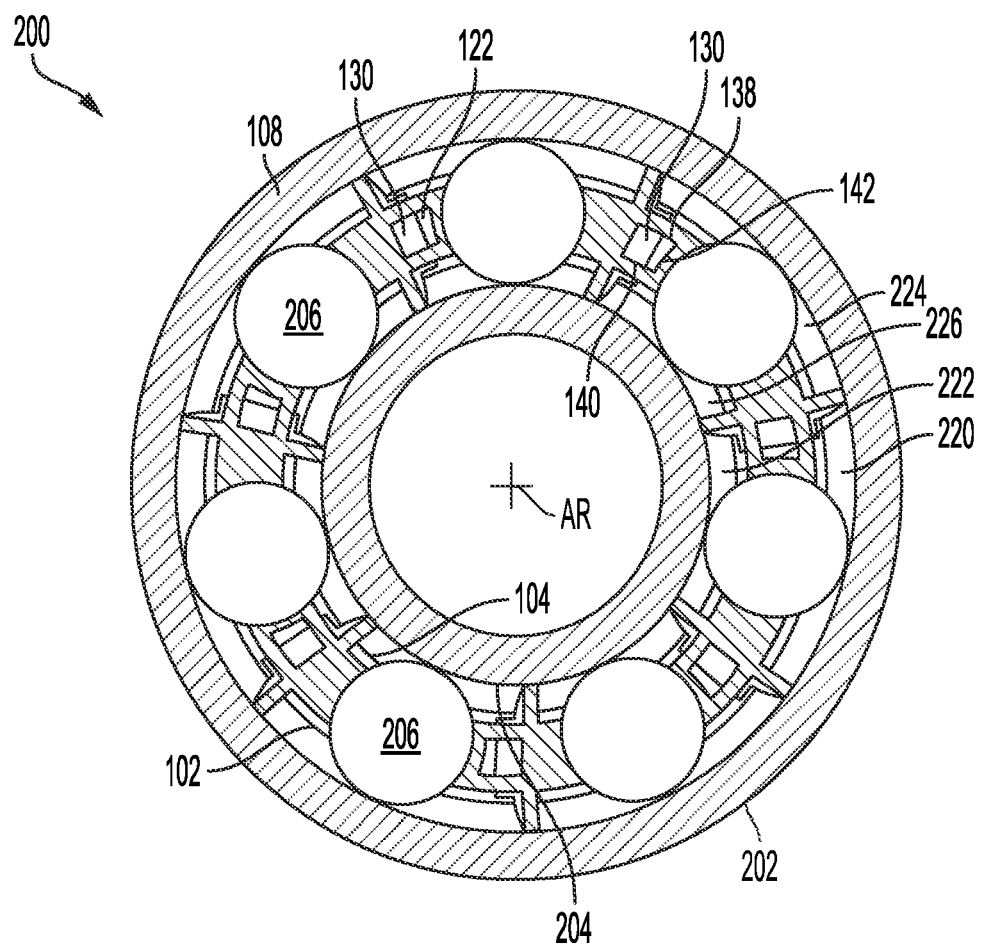
FIG. 11 is a cross-sectional view generally along line 11-11 in FIG. 10.

FIG. 11 is a cross-sectional view generally along line 11-11 in FIG. 10.

Figure 12:
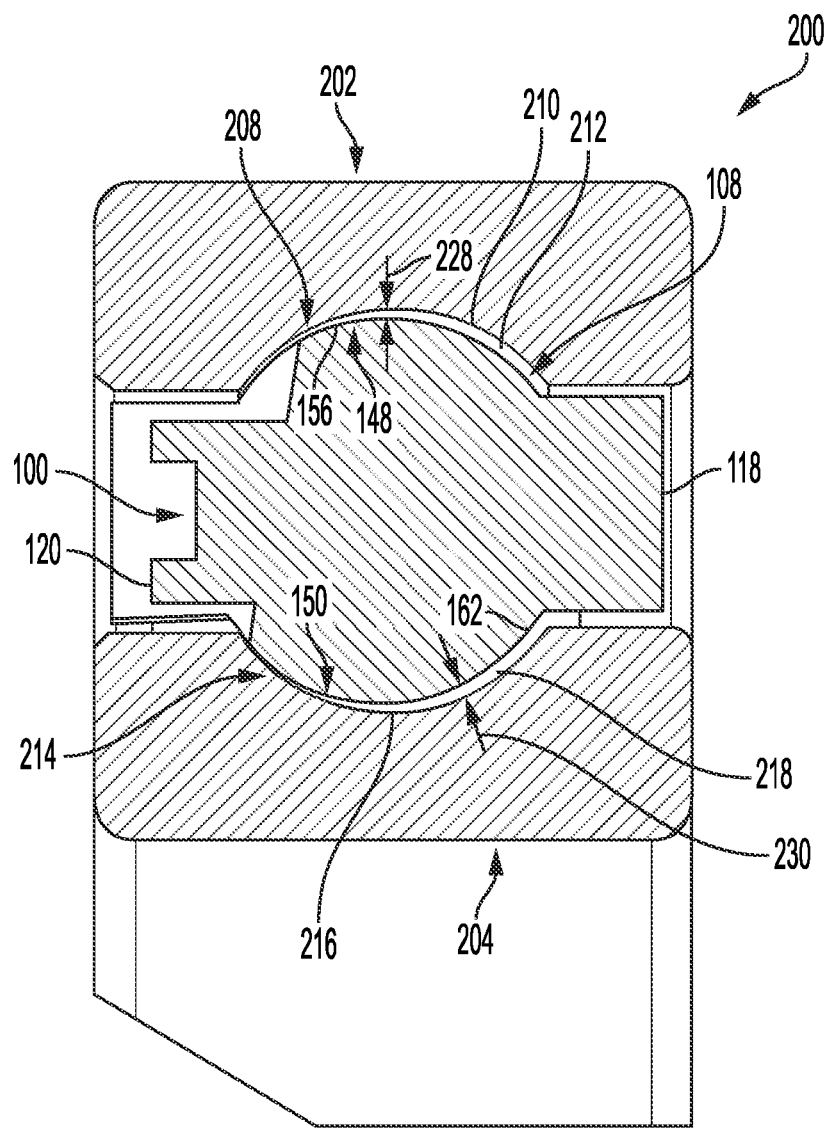
FIG. 12 is a cross-sectional view generally along line 12-12 in FIG. 10.

FIG. 12 is a cross-sectional view generally along line 12-12 in FIG. 10. The following should be viewed in light of FIGS. 1 through 12. Outer ring 202 includes radially inwardly facing surface 208. Portion 210 of surface 208 defines circumferentially continuous groove 212. Inner ring 204 includes radially inwardly facing surface 214. Portion 216 of surface 214 defines circumferentially continuous groove 218. Balls 206 are disposed in grooves 212 and 218.

Each segment 102 includes surface 164 facing radially outwardly. Each segment 104 includes surface 166 facing radially inwardly. In the example of FIG. 11: a surface 130, a surface 164, a ball 206, and surface 208 define a channel 220 passing through bearing 200; the surface 130, a surface 166, the ball 206, and surface 214 define a channel 222 passing through bearing 200; a surface 136, a surface 164, the ball 206, and surface 208 define a channel 224 passing through bearing 200; and the surface 136, a surface 166, the ball 206, and surface 214 define a channel 226 passing through bearing 200. By a channel "passing through bearing 200," we mean the channel is open from axial end AE1 of bearing 200, facing direction AD1, to axial end AE2 of bearing 200, facing direction AD2.

Segments 156 are located in groove 212; and segments 162 are located in groove 218. In FIG. 12: cage 100 is in a rest position and cage 100 is free of contact with ring 202 and ring 204. In the example of FIG. 7: surface 148 follows the contour of surface 208; and surface 150 follows the contours of surface 214. In the example of FIG. 7: surfaces 148 and 208 are separated by gap 228; and surfaces 150 and 214 are separated by gap 230.

In the example of FIG. 7: gap 228 is uniform from end 118 to end 120; and gap 230 is uniform from end 118 to end 120. Note that due to the curvilinear shape of vanes 108, gaps 228 and 230 appear to be non-uniform in FIG. 12. In the example of FIG. 7, gap 228 and gap 230 are equal.

It is understood that other configurations of gaps between surfaces 148 and 208 and between surfaces 150 and 214 are possible. For example, in an example embodiment not shown: one or both of gaps 228 and gaps 230 are not uniform between ends 118 and 120; or gaps 228 and 230 are not equal; or surface 148 follows a contour other than that of surface 208; or surface 150 follows a contour other than that of surface 214. Combinations of the preceding example embodiments also are possible.

Figure 13:
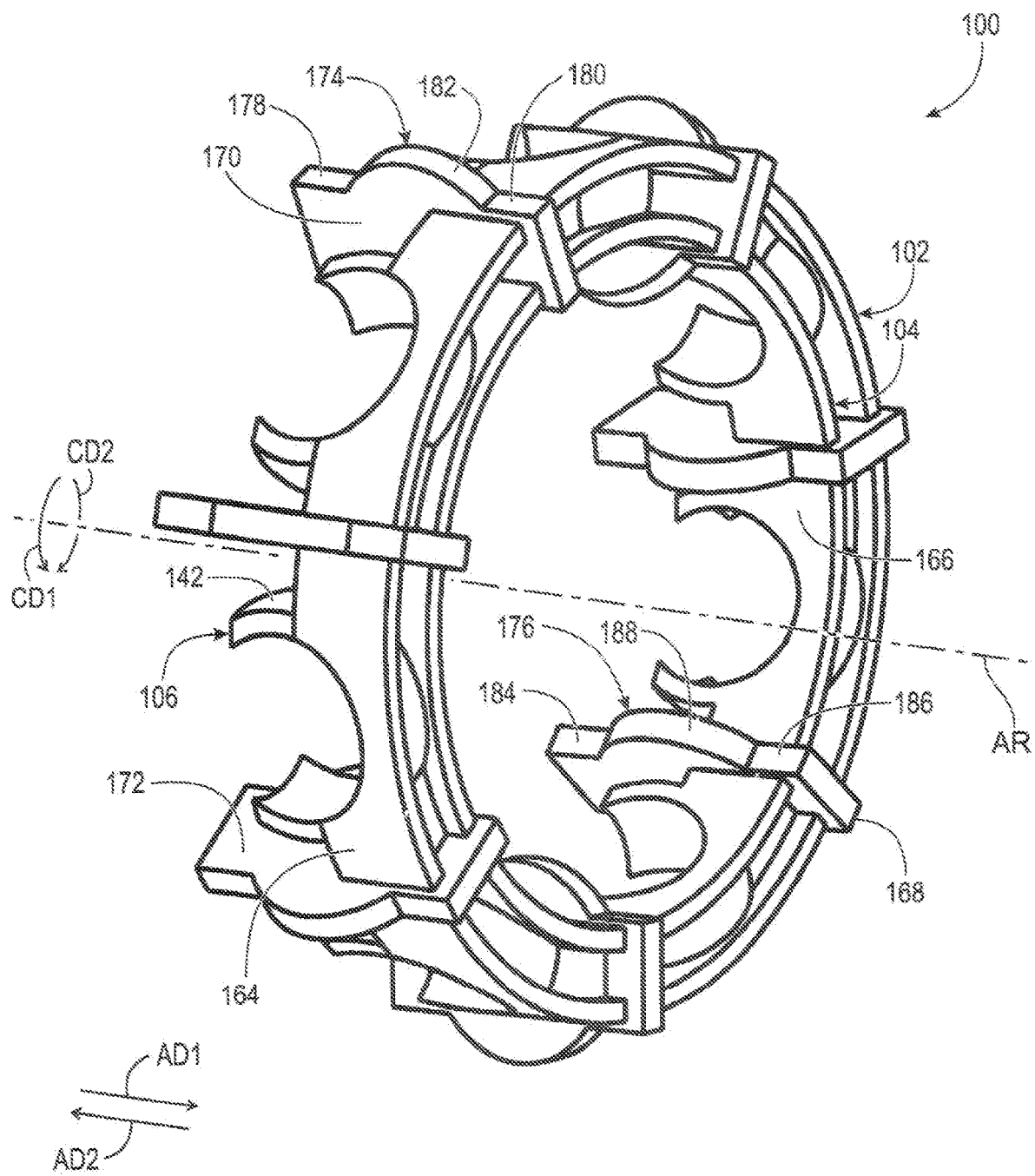
FIG. 13 is an isometric view of an example bearing cage with planar pumping vanes.

FIG. 13 is an isometric view of example bearing cage 100 with planar pumping vanes.

Figure 14:
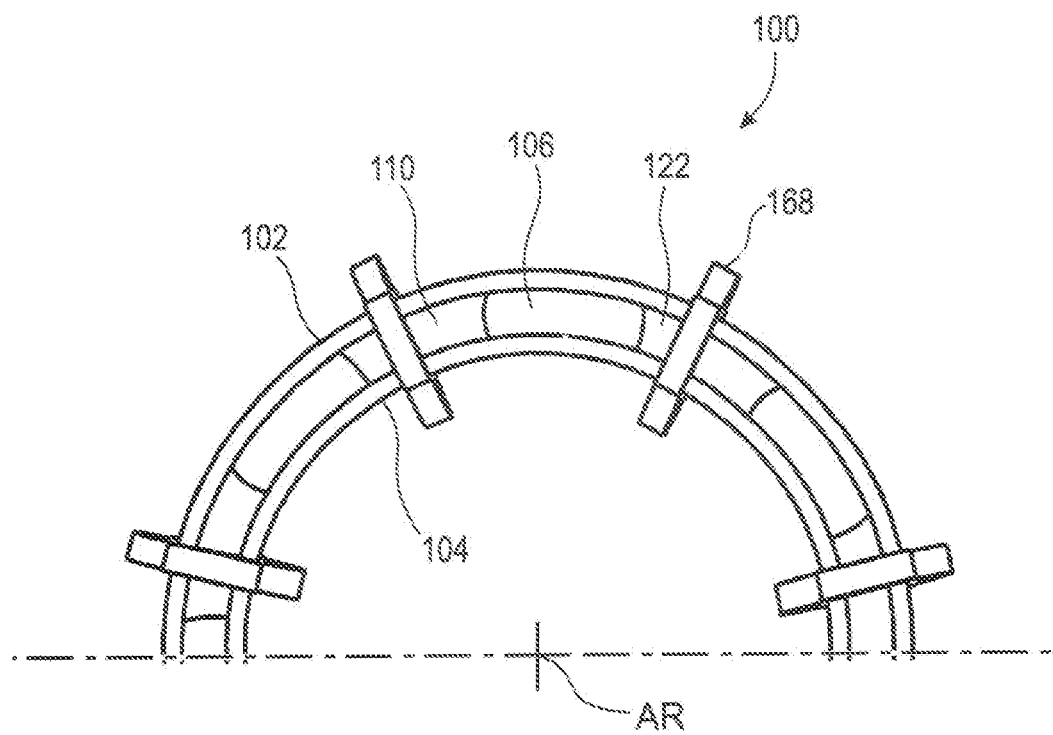
FIG. 14 is a partial front view of the bearing cage shown in FIG. 13.

FIG. 14 is a partial front view of bearing cage 100 shown in FIG. 13.

Figure 15:
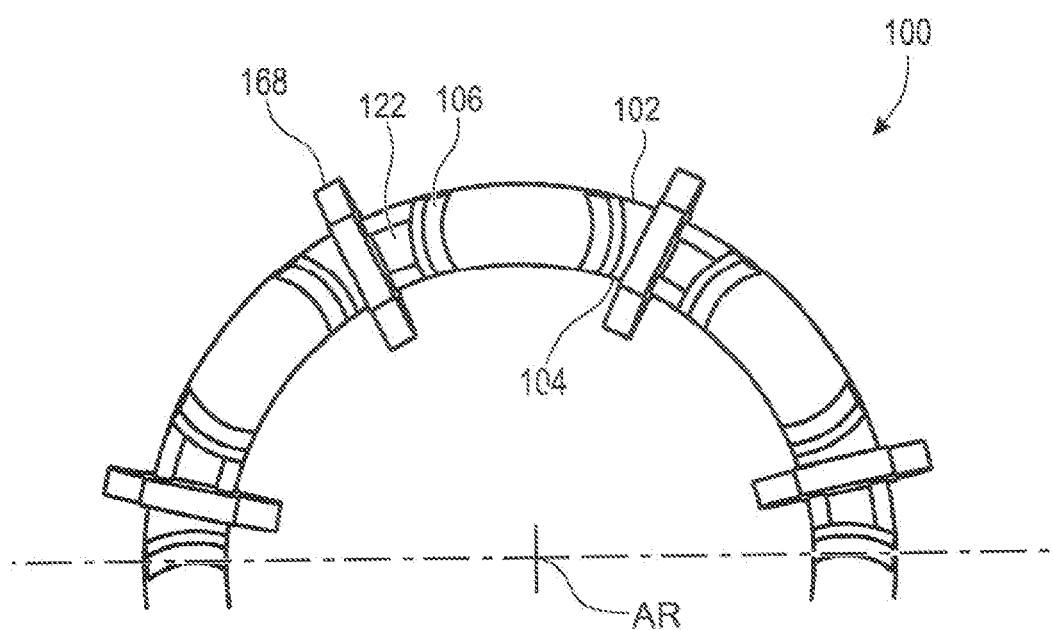
FIG. 15 is a partial back view of the bearing cage shown in FIG. 13.

FIG. 15 is a partial back view of bearing cage 100 shown in FIG. 13.

Figure 16:
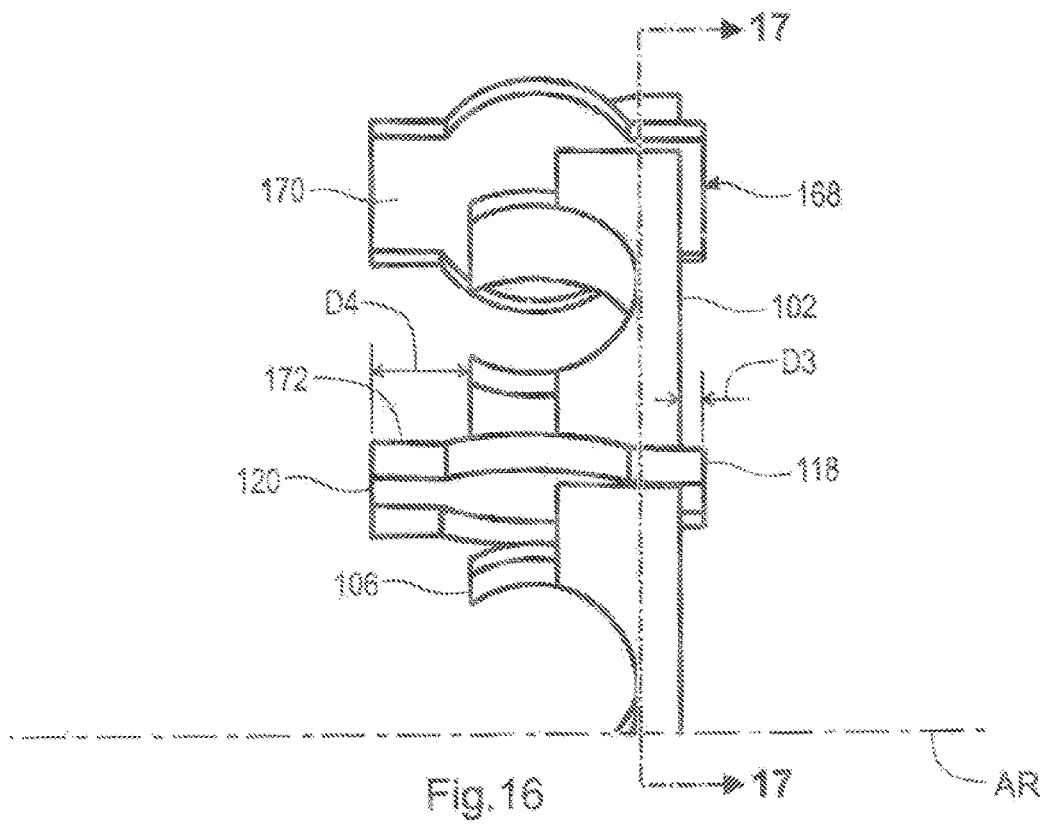
FIG. 16 is a partial side view of the bearing cage shown in FIG. 13.

FIG. 16 is a partial side view of bearing cage 100 shown in FIG. 13.

Figure 17:
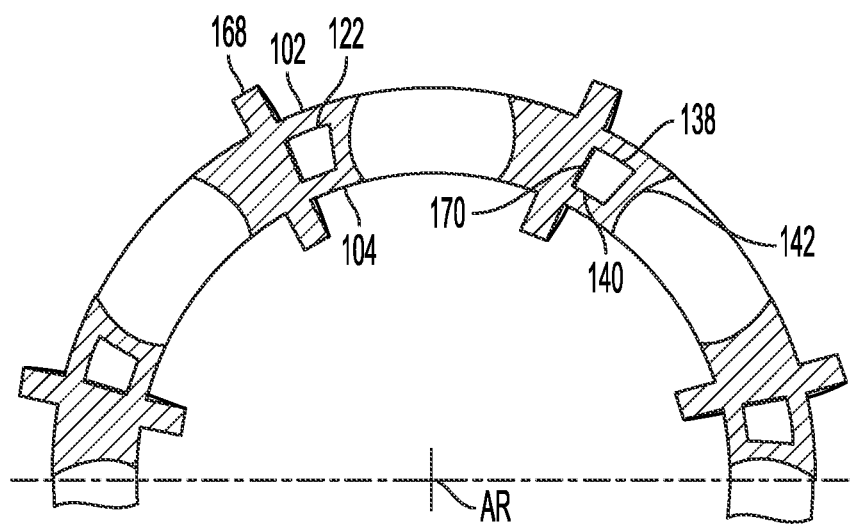
FIG. 17 is a cross-sectional view generally along line 17-17 in FIG. 16.

FIG. 17 is a cross-sectional view generally along line 17-17 in FIG. 16.

The following should be viewed in light of FIGS. 1 through 6 and 13 through 17. The discussion for cage 100 shown in FIGS. 1 through 6 is applicable to cage 100 shown in FIGS. 13 through 17 except as noted. In the example of FIG. 13: vanes 168 replace vanes 108; and each vane 168 includes planar surface 170 facing at least partly in circumferential direction CD1. Thus, surface 170 does not form a concave shape facing in direction CD1. In the example of FIG. 13, each vane 168 includes planar surface 172 facing in direction CD2. Thus, surface 172 does not form a convex shape facing in direction CD2. In an example embodiment (not shown), for vane 168: one of surface 170 or 172 is planar; and the other of surface 170 or 172 is non-planar.

Each channel 122 is defined by a surface 170, a surface 138, a surface 140, and a surface 142. In the example of FIG. 13, each channel 122 is defined solely by the surface 170, the surface 138, the surface 140, and the surface 142.

In the example of FIG. 13: surfaces 174 of vanes 168 are located past annular segments 102 and 104 in radially outer direction RD1; and surfaces 176 of vanes 168 are located past annular segments 104 in radially inner direction RD2. Each surface 174 includes: segment 178, segment 180, and segment 182 bracketed by segments 178 and 180 and connecting segments 178 and 180. Segment 182 extends past segments 178 and 180 in direction RD1. In the example of FIG. 13, segment 182 forms at least one smooth curve extending radially outwardly. Each surface 176 includes: segment 184, segment 186, and segment 188 bracketed by segments 184 and 186 and connecting segments 184 and 186. Segment 188 extends past segments 184 and 186 in direction RD2. In the example of FIG. 13, segment 188 forms at least one smooth curve extending radially inwardly.

In the example of FIG. 13: axial ends 118 of vanes 168 extend past segments 102 and 104 by distance D3 in axial direction AD1; axial ends 120 extend past segments 102 and 104 by distance D4 in direction AD2; and distances D3 and D4 are different. In the example of FIG. 13, distance D4 is greater than distance D3. In the example of FIG. 13, distance D3 is equal to distance D1 and distance D4 is equal to distance D2. In an example embodiment (not shown), distance D3 is not equal to distance D1 and distance D4 is not equal to distance D2. It is understood that other ratios of distances D1 and D3 and of distances D2 and D4 are possible.

Figure 18:
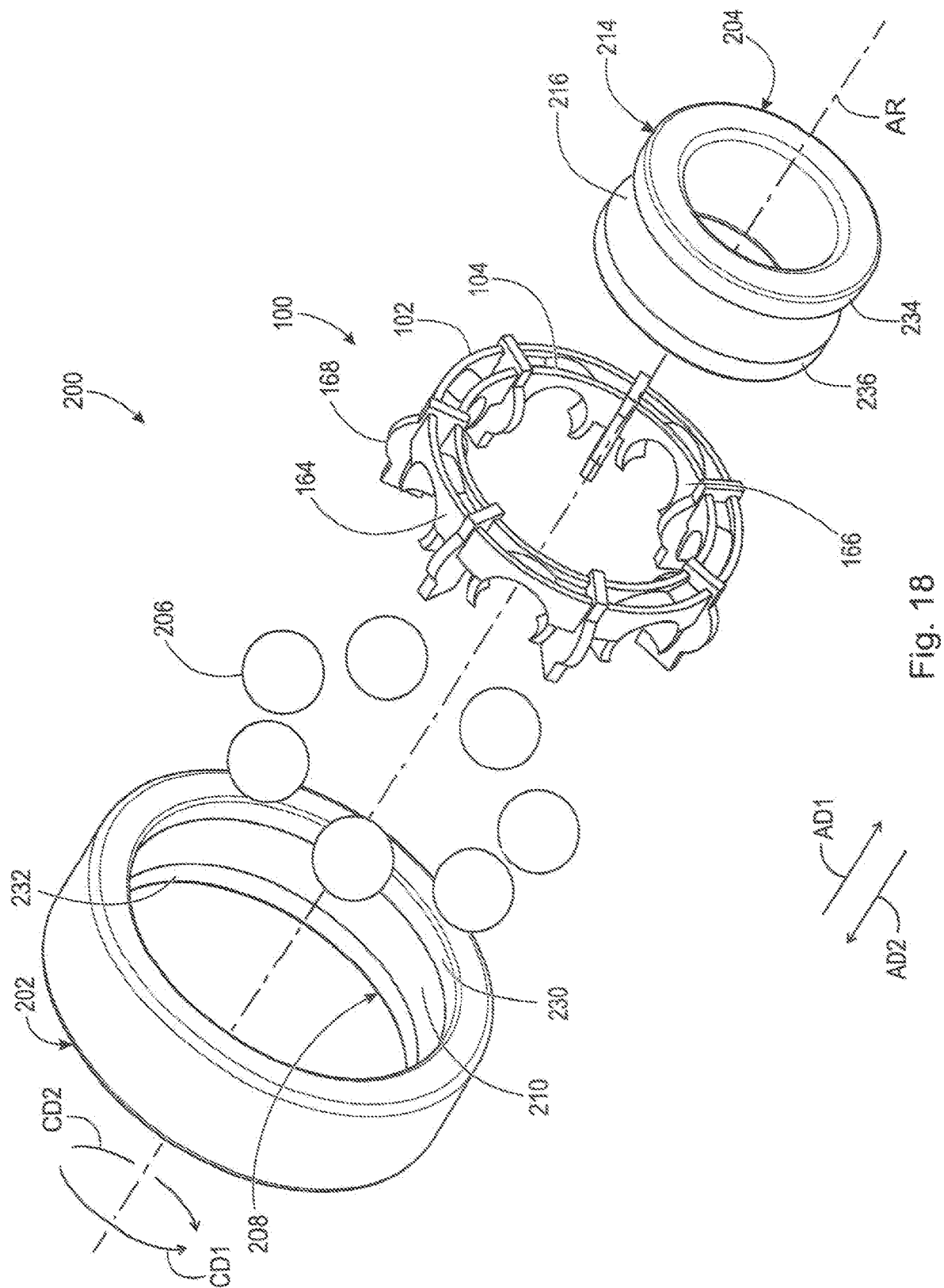
FIG. 18 is an exploded view of an example bearing with the bearing cage shown in FIG. 13.

FIG. 18 is an exploded view of example bearing 200 with bearing cage 100 shown in FIG. 13.

Figure 19:
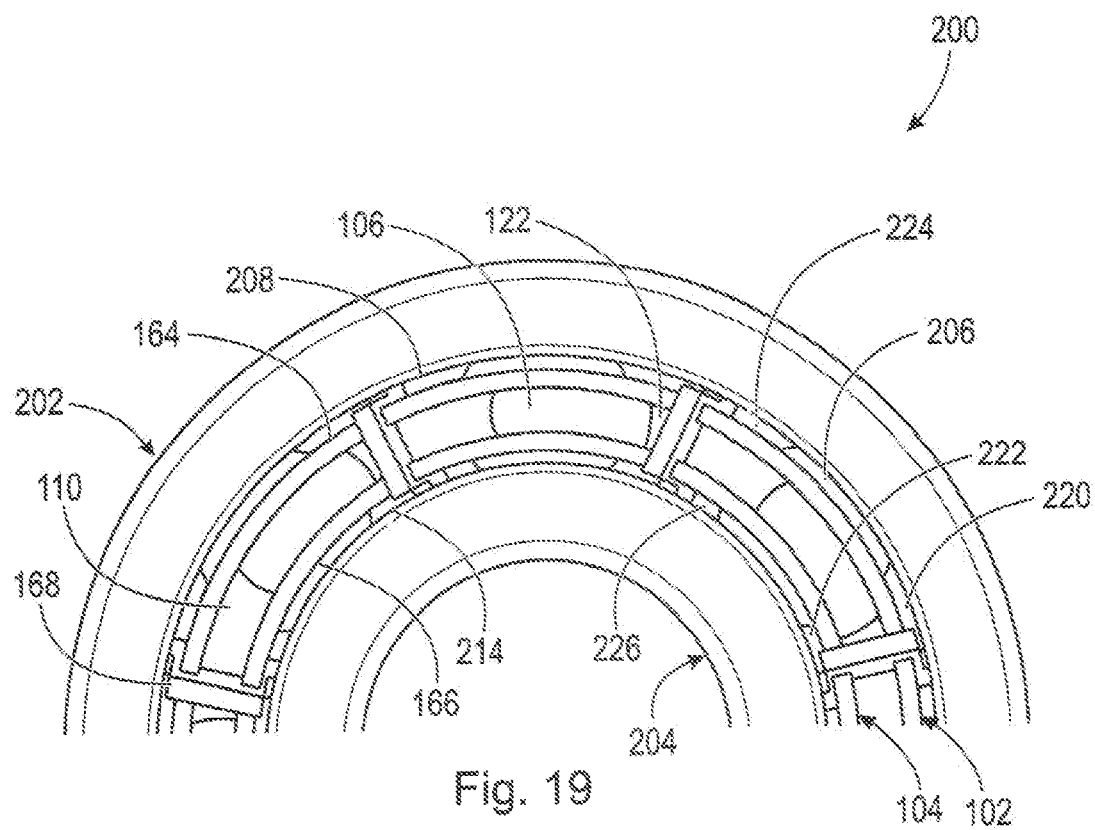
FIG. 19 is a partial front view of the bearing shown in FIG. 18.

FIG. 19 is a partial front view of bearing 200 shown in FIG. 18.

Figure 20:
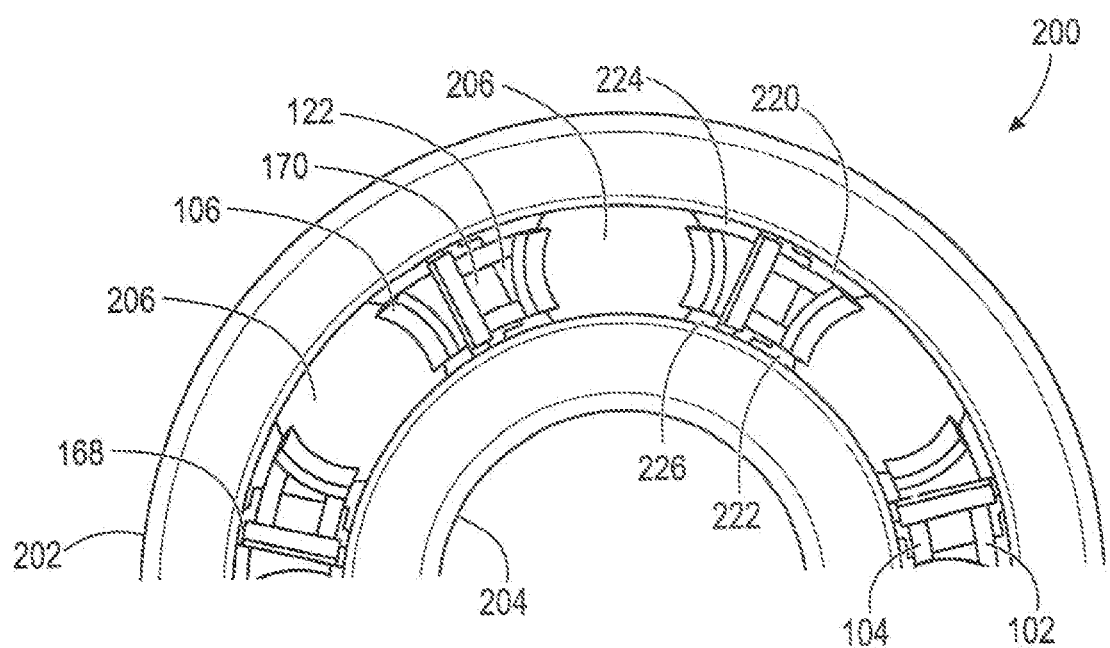
FIG. 20 is a partial back view of the bearing shown in FIG. 18.

FIG. 20 is a partial back view of bearing 200 shown in FIG. 18.

Figure 21:
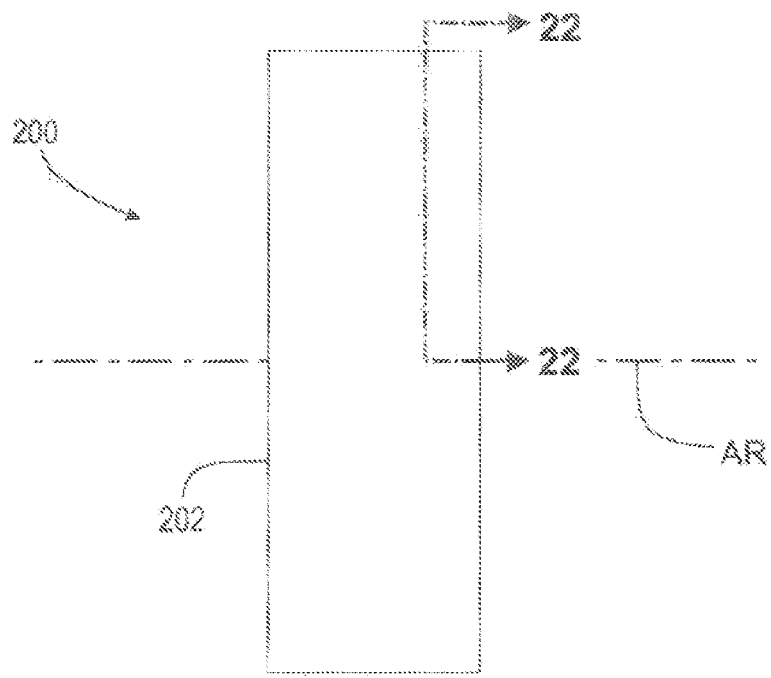
FIG. 21 is a side view of the bearing shown in FIG. 18.

FIG. 21 is a side view of bearing 200 shown in FIG. 18.

Figure 22:
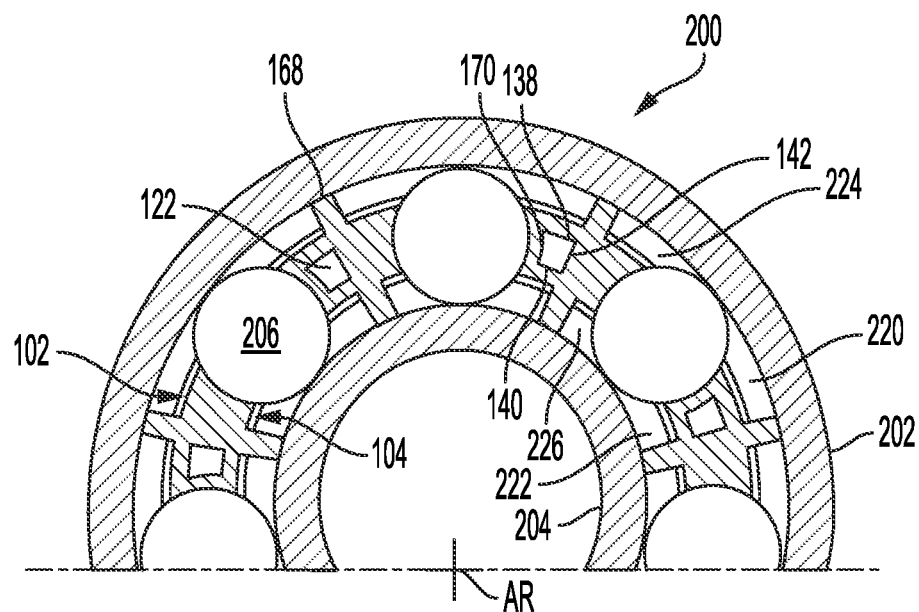
FIG. 22 is a cross-sectional view generally along line 22-22 in FIG. 22.

FIG. 22 is a cross-sectional view generally along line 22-22 in FIG. 19. The following should be viewed in light of FIGS. 13 through 22. In the example of FIG. 18: a surface 170, a surface 164, a ball 206, and surface 208 define a channel 220 passing through bearing 200; the surface 170, a surface 166, the ball 206, and surface 214 define a channel 222 passing through bearing 200; a surface 172, a surface 164, the ball 206, and surface 208 define a channel 224 passing through bearing 200; and the surface 172, a surface 166, the ball 206, and surface 214 define a channel 226 passing through bearing 200.

Segments 156 are located in groove 212; and segments 162 are located in groove 218. The discussion regarding gaps 228 and 230 for bearing 200 in FIG. 7 is applicable to bearing 200 in FIG. 18.

Figure 23:
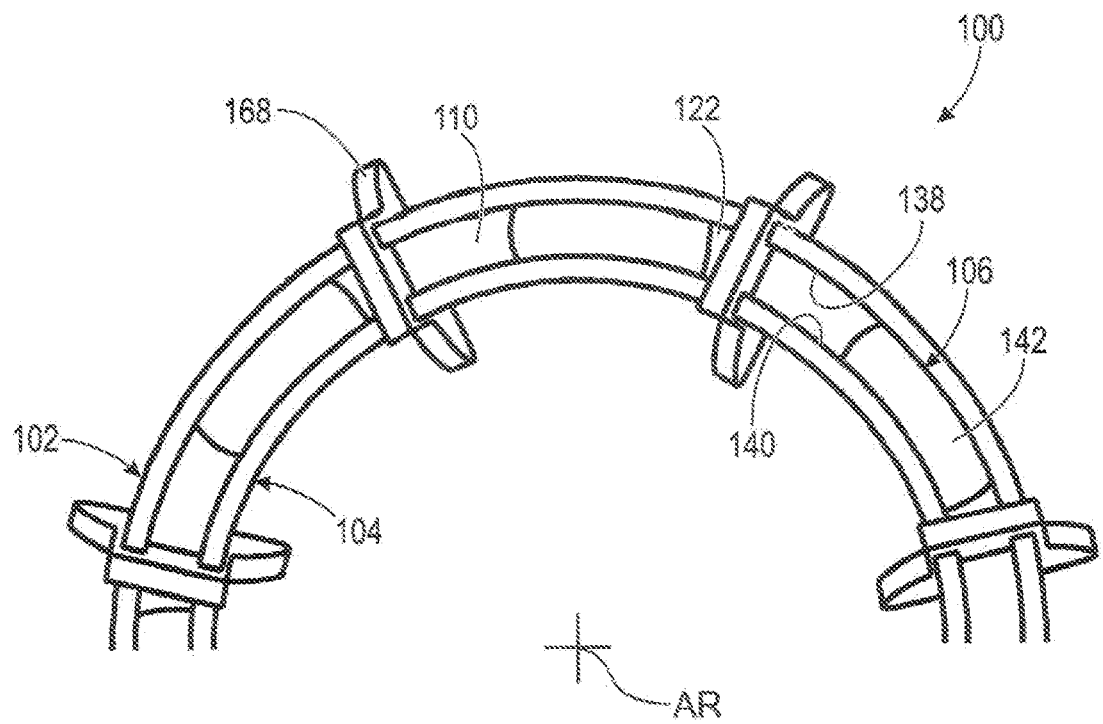
FIG. 23 is partial front view of an example bearing cage with curved and extended pumping vanes.

FIG. 23 is partial front view of example bearing cage 100 with curved and extended pumping vanes 108.

Figure 24:
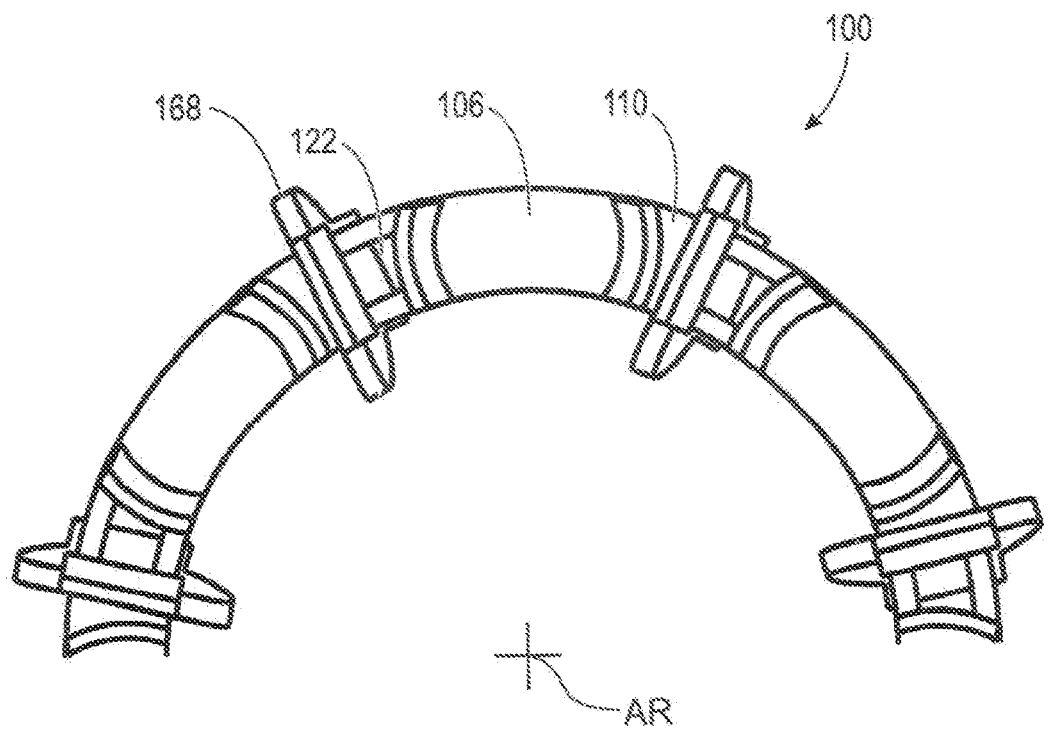
FIG. 24 is a partial back view of the bearing cage shown in FIG. 23.

FIG. 24 is a partial back view of bearing cage 100 shown in FIG. 23.

Figure 25:
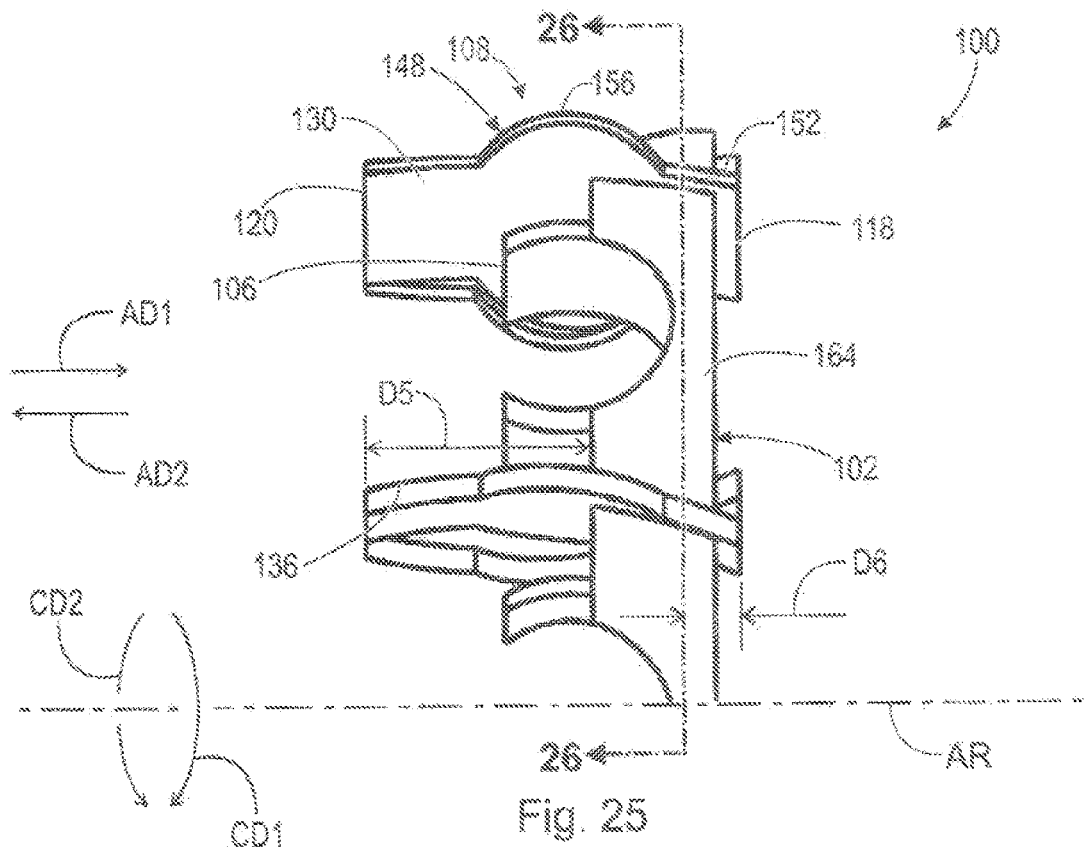
FIG. 25 is a partial side view of the bearing cage shown in FIG. 23.

FIG. 25 is a partial side view of bearing cage 100 shown in FIG. 23.

Figure 26:
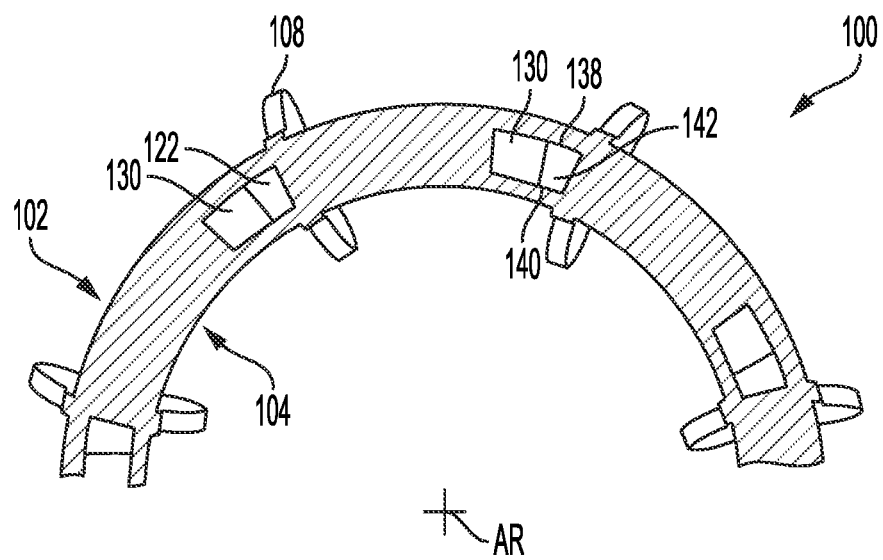
FIG. 26 is a cross-sectional view generally along line 26-26 in FIG. 25.

FIG. 26 is a cross-sectional view generally along line 26-26 in FIG. 25. The following should be viewed in light of FIGS. 1 through 6 and 23 through 26. The discussion for cage 100 shown in FIGS. 1 through 6 is applicable to cage 100 shown in FIGS. 23 through 26 except as noted. In the example of FIG. 23, vanes 108 extend further past segments 102 and 104 in direction AD2 than in FIGS. 1 through 6. Thus, distance D5 in FIG. 25, between annular segment 102 and end 120, is larger than dimension D2 in FIG. 4. In the example of FIG. 23, distance D6 is equal to distance D1. In an example embodiment (not shown), distance D6 is not equal to distance D1.

Figure 27:
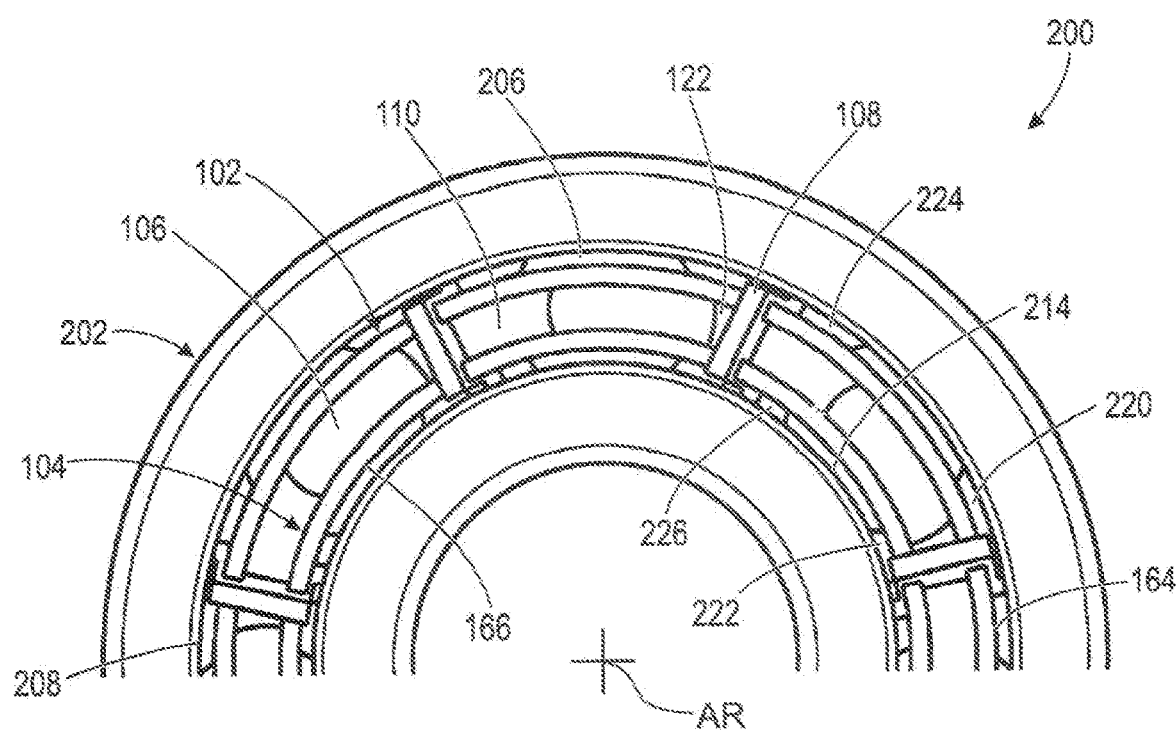
FIG. 27 is a partial front view of an example bearing with the bearing cage shown in FIG. 23.

FIG. 27 is a partial front view of example bearing 200 with bearing cage 100 shown in FIG. 23.

Figure 28:
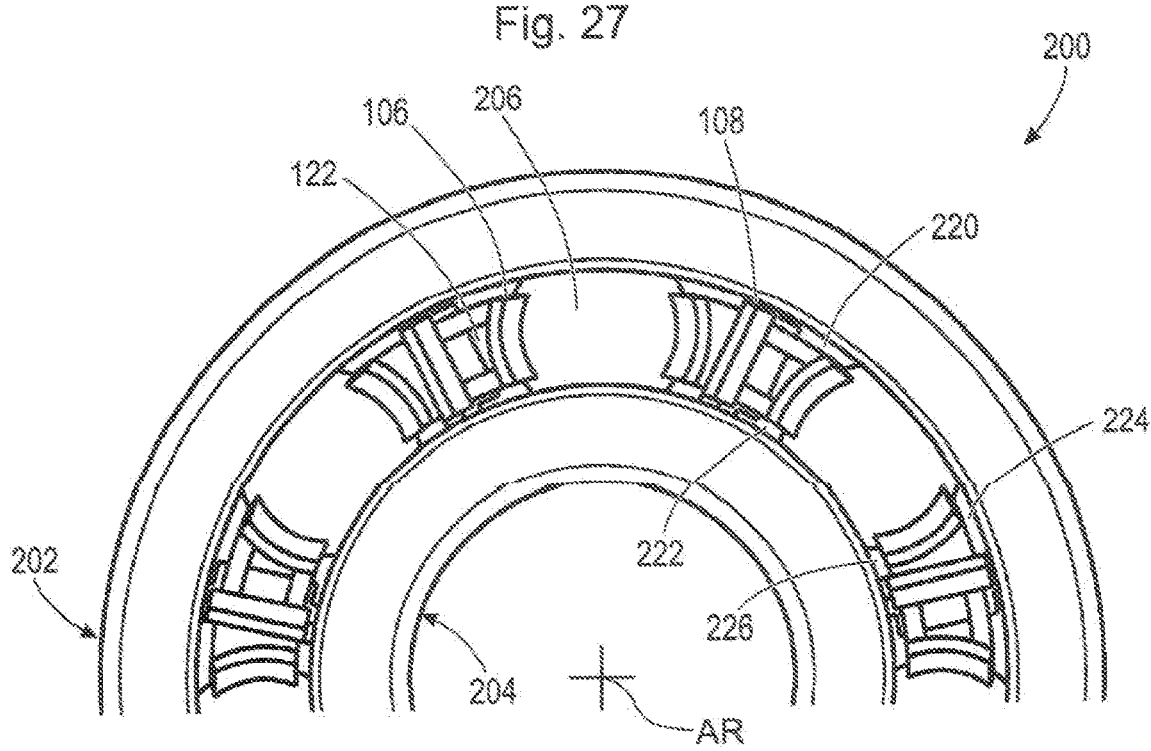
FIG. 28 is a partial back view of the bearing shown in FIG. 27.

FIG. 28 is a partial back view of the bearing 200 shown in FIG. 27.

Figure 29:
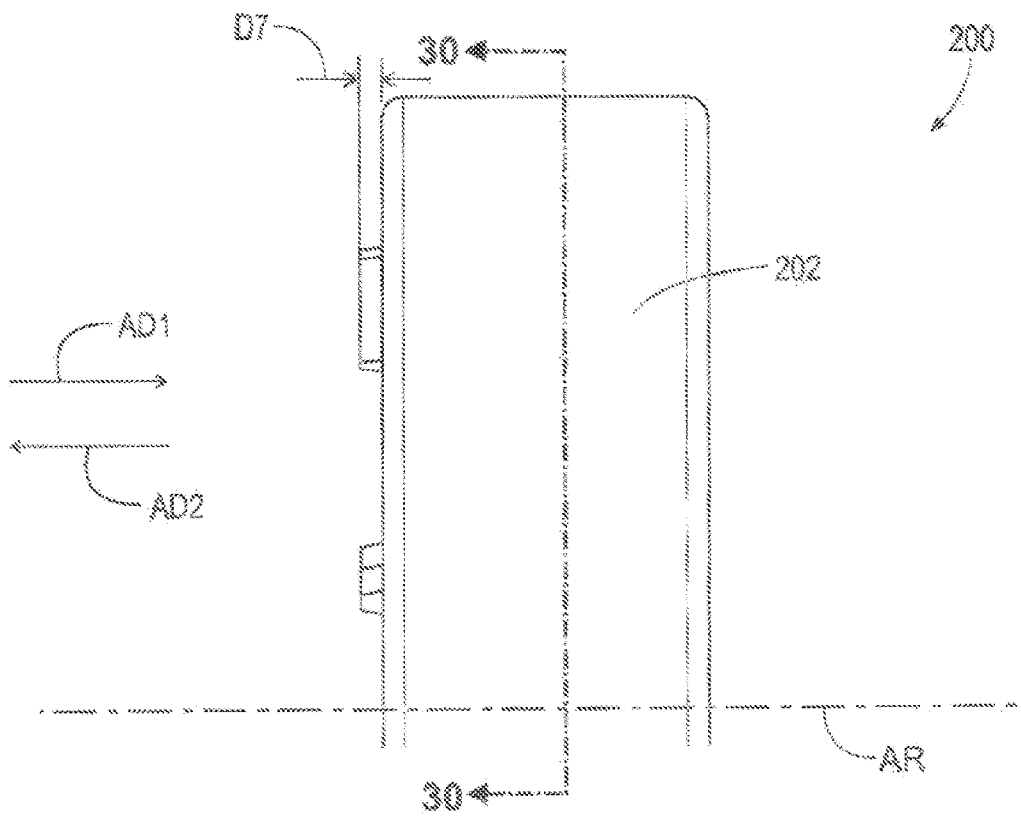
FIG. 29 is a partial side view of the bearing shown in FIG. 27.

FIG. 29 is a partial side view of bearing 200 shown in FIG. 27.

Figure 30:
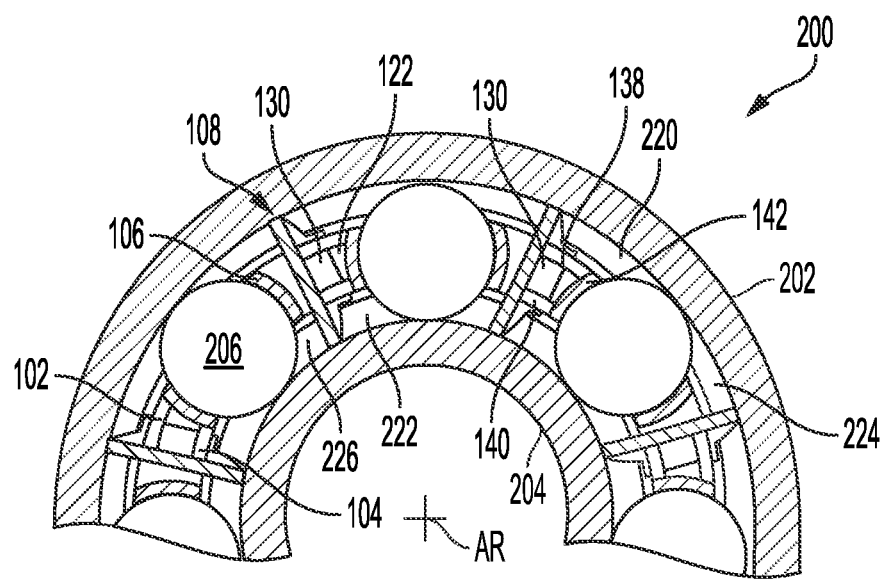
FIG. 30 is a cross-sectional view generally along line 30-30 in FIG. 29.

FIG. 30 is a cross-sectional view generally along line 30-30 in FIG. 29. The following should be viewed in light of FIGS. 1 through 12 and 23 through 30. The discussion for bearing 200 shown in FIG. 7 is applicable to bearing 200 shown in FIG. 27 except as follows. In the example of FIG. 27, vanes 108 extend past outer ring 202 and inner ring 204 by dimension D7 in direction AD2.

Figure 31:
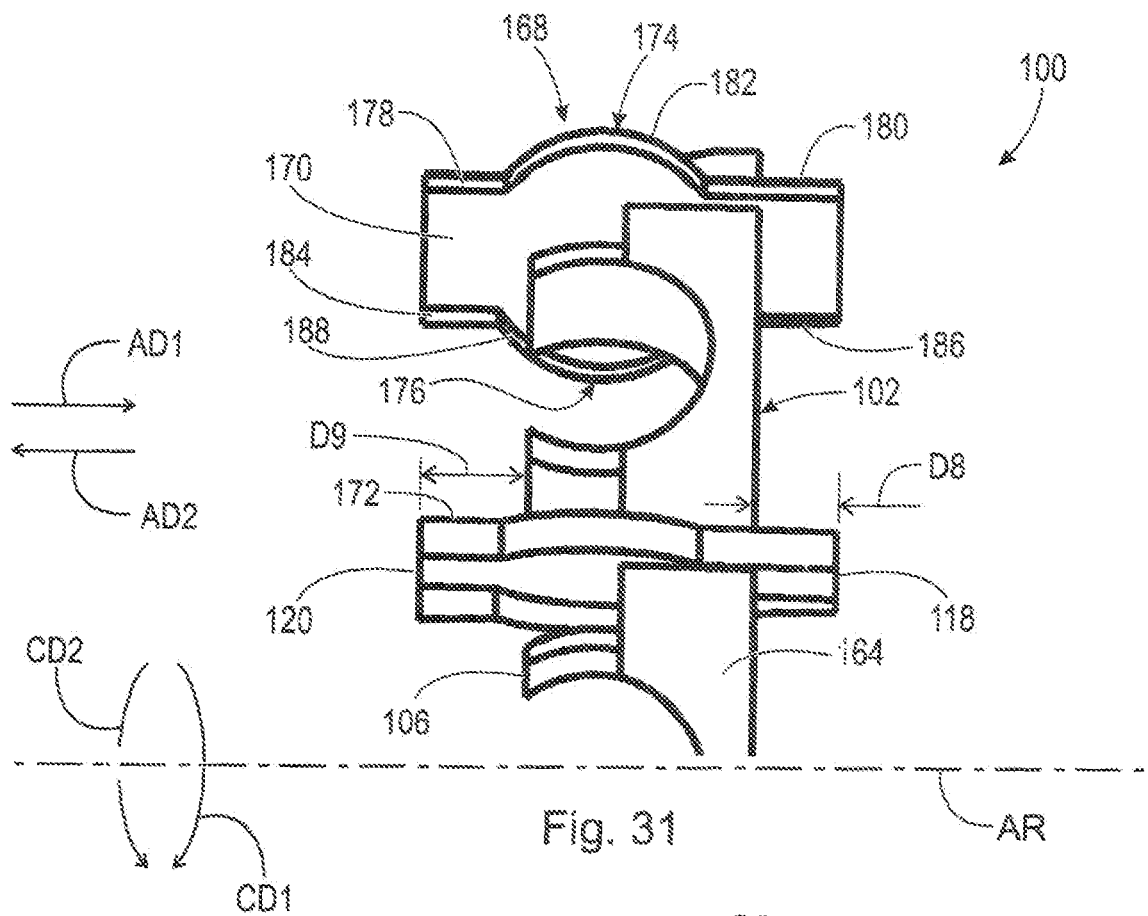
FIG. 31 is partial side view of an example bearing cage with planar and extended pumping vanes.

FIG. 31 is partial side view of example bearing cage 100 with planar and extended pumping vanes 168. The following should be viewed in light of FIGS. 13 through 17 and 31. The discussion for cage 100 shown in FIGS. 13 through 17 is applicable to cage 100 shown in FIG. 31 except as noted. The views shown in FIGS. 14 and 15 are analogous to partial front and back views, respectively, of bearing cage 100 shown in FIG. 31. For bearing cage 100 in FIG. 31, vanes 168 extend further in axial direction AD2 than in bearing cage 100 shown in FIG. 13. For example, dimension D8 in direction AD1, from segments 102 and 104 to end 118 is greater than dimension D3 shown in FIG. 16. In the example of FIG. 31, distance D9 is equal to distance D4. In an example embodiment (not shown), distance D9 is not equal to distance D4.

Figure 32:
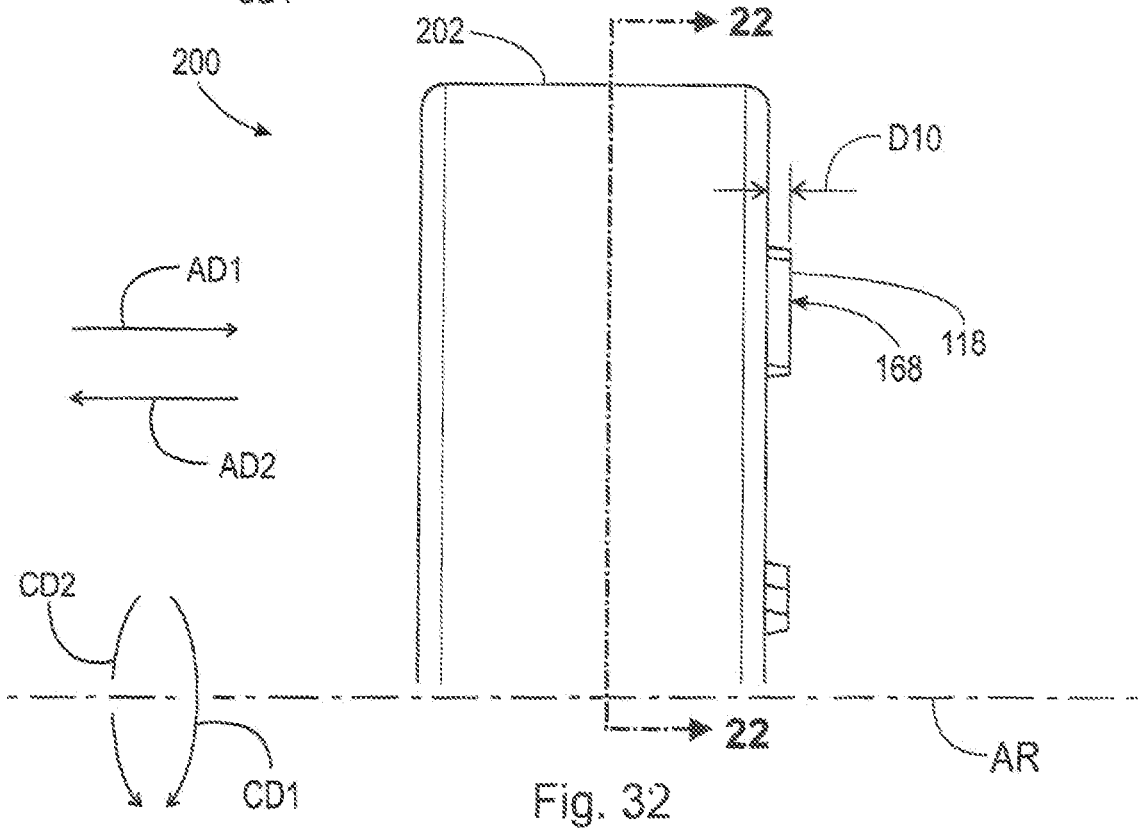
FIG. 32 is a partial side view of an example bearing with the bearing cage shown in FIG. 31.

FIG. 32 is a partial side view of example bearing 200 with bearing cage 100 shown in FIG. 31. The following should be viewed in light of FIGS. 13 through 22, 31, and 32. The discussion for bearing 200 shown in FIG. 18 is applicable to bearing 200 shown in FIG. 32 except as noted. The views shown in FIGS. 19 and 20 are analogous to partial front and back views, respectively, of bearing cage 200 shown in FIG. 32. FIG. 22 is the same for bearing 200 in FIG. 18 and bearing 200 shown in FIG. 32. In the example of FIG. 32, vanes 168 extend past segments 102 and 104 in direction AD1 by dimension D10.

It is understood that other configurations of vanes 108 and 168 are possible. In an example embodiment (not shown): vanes 108 extend past rings 202 and 204 in axial directions AD1 and AD2; vanes 108 extend past rings 202 and 204 in axial direction AD1 and not in axial direction AD2; vanes 168 extend past rings 202 and 204 in axial directions AD1 and AD2; and vanes 168 extend past rings 202 and 204 in axial direction AD2 and not in axial direction AD1.

In the example of FIG. 1, axial ends 118 and 120 are circumferentially off-set. In an example embodiment (not shown), axial ends 118 and 120 of vanes 108 are not circumferentially off-set. In the example of FIG. 1: angle 190 between surface 130 and surface 138 and angle 192 between surface 130 and surface 140 is 90 degrees. However, vanes 108 are not limited to a particular radial configuration with respect to segments 102 and 104.

In the example of FIG. 13, axial ends 118 and 120 are not circumferentially off-set. In an example embodiment (not shown), axial ends 118 and 120 of vanes 168 are circumferentially off-set. In the example of FIG. 13: angle 194 between surface 170 and surface 138 and angle 196 between surface 170 and surface 140 is 90 degrees. However, vanes 168 are not limited to a particular radial configuration with respect to segments 102 and 104.

The following should be viewed in light of FIGS. 1 through 32. The following describes a method of method of pumping a lubricating fluid through a bearing. The bearing includes: an inner ring with first circumferential groove; an outer ring with a second circumferential groove; a cage radially disposed between the inner ring and the outer ring; and a ball. The cage includes: a first annular segment; a second annular segment; a curved segment; and a vane connected to the first and second segments. The ball is disposed in the first and second circumferential grooves and is retained by the curved segment. A first step rotates the cage in circumferential direction CD1. A second step contacts the lubricating fluid with the vane. A third step pumps, with the vane, the lubricating fluid through the bearing via a first channel in the cage defined by the first annular segment, the curved segment, the second annular segment, and a first surface of the vane.

In an example embodiment a fourth step pumps, with the vane, the lubricating fluid through the bearing via a second channel formed by: pumping, with the vane, the lubricating fluid through the bearing via: a second channel formed by the first annular segment, the first surface of the vane, the outer ring, and the ball; or a second channel formed by second annular segment, the first surface of the vane, the inner ring, and the ball; or a second channel formed by the first annular segment, a second surface of the vane, the outer ring, and the ball; or a second channel formed by second annular segment, a second surface of the vane, the inner ring, and the ball.

In an example embodiment: the first surface of the vane is concave; or the first surface of the vane is planar.

Cage 100 and bearing 200 include integral structure enabling flow of lubricating fluid through cage 100 and bearing 200. Thus, in a system including cage 100 and bearing 200, additional components, such as pumps, are not required to ensure a circular flow of lubricating fluid through the system.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

List of Reference Characters:
AD1 axial direction
AD2 axial direction
AE1 axial end, bearing
AE2 axial end, bearing
AR axis of rotation
CD1 circumferential direction
CD2 circumferential direction
D1 distance
D2 distance
D3 distance
D4 distance
D5 distance
D6 distance
D7 distance
D8 distance
D9 distance
D10 distance
RD1 radially outer direction
RD2 radially inner direction
100 bearing cage
102 annular segment
104 annular segment
106 curved segment
108 vane
110 blocking wall
118 axial end, vane 120 axial end, vane
122 channel
130 curved surface, vane 108
136 surface, vane 108
138 surface, annular segment
140 surface, annular segment
142 surface, curved segment
148 surface, vane 108
150 surface, vane 108
152 segment, surface 148
154 segment, surface 148
156 segment, surface 148
158 segment, surface 150
160 segment, surface 150
162 segment, surface 150
164 surface, segment
166 surface, segment
168 vane
170 planar surface, vane 168
172 planar surface, vane 168
174 surface, vane 168
176 surface, vane 168
178 segment, surface 174
180 segment, surface 174
182 segment, surface 174
184 segment, surface 176
186 segment, surface 176
188 segment, surface 176
190 angle
192 angle

The invention claimed is:

1. A cage for a bearing, comprising:
a first annular segment;
a second annular segment located radially inwardly of the first annular segment;
a vane connected to the first annular segment and to the second annular segment; and,
a curved segment including a pair of terminal ends extending towards each other such that the curved segment is configured to retain a ball of the bearing, the curved segment being connected to the first annular segment and the second annular segment; and, wherein the first annular segment, the second annular segment, the vane, and the curved segment define a channel passing through the cage.

2. The cage of claim 1, wherein the vane includes:
a first axial end facing at least partly in a first axial direction parallel to an axis of rotation of the cage; and,
a second axial end facing at least partly in a second axial direction, opposite the first axial direction, the second axial end off-set from the first axial end in a circumferential direction around the axis of rotation.

3. The cage of claim 1, wherein the vane includes a surface curved along an axial direction parallel to an axis of rotation of the cage.

4. The cage of claim 3, wherein the surface of the vane:
faces in a circumferential direction around an axis of rotation of the cage; and,
defines a concave shape.

5. The cage of claim 3, wherein the first annular segment, the second annular segment, the surface of the vane, and the curved segment of the cage define the channel passing through the cage.

6. The cage of claim 1, wherein:
the vane includes a planar surface; and,
the first annular segment, the second annular segment, the planar surface of the vane, and the curved segment of the cage define the channel passing through the cage.

7. The cage of claim 1, wherein:
the vane extends past the first annular segment and the second annular segment by:
a first distance in a first axial direction parallel to tan axis of rotation of the cage; and,
a second distance in a second axial direction, opposite the first axial direction; and,
the first distance is different from the second distance.

8. The cage of claim 1, wherein:
the vane includes a surface located radially outwardly of the first annular segment; or,
the vane includes a surface located radially inwardly of the second annular segment.

9. The cage of claim 8, wherein:
the vane includes the surface located radially outwardly of the first annular segment, the surface faces at least partly in a radially outer direction orthogonal to an axis of rotation of the cage, the surface includes a first segment, a second segment, and a third segment connecting the first segment and the second segment, and the third segment extends past the first segment and the second segment in the radially outer direction; or,
the vane includes the surface located radially inwardly of the second annular segment, the surface faces at least partly in a radially inner direction orthogonal to an axis of rotation of the cage, the surface includes a first segment, a second segment, and a third segment connecting the first segment and the second segment, and the third segment extends past the first segment and the second segment in the radially inner direction.

10. The cage of claim 1, wherein:
the vane includes a surface located radially outwardly of the first annular segment and facing radially outwardly, and,
the surface of the vane forms a curve extending radially outwardly.

11. The cage of claim 1, wherein:
the vane includes a surface located radially inwardly of the second annular segment and facing radially inwardly; and,
the surface of the vane forms a curve extending radially inwardly.

12. A bearing, comprising:
an outer ring including a radially inwardly facing surface defining a first circumferentially continuous groove;
an inner ring including a radially outwardly facing surface defining a second circumferentially continuous groove;
a cage radially disposed between the inner ring and the outer ring and including:
a first annular segment;
a second annular segment located radially inwardly of the first annular segment;
a vane connected to the first annular segment and to the second annular segment; and,
a curved segment connected to the first annular segment and the second annular segment, the curved segment including a pair of terminal ends extending towards each other to define a ball pocket; and,
a ball retained by the curved segment and disposed in the first circumferentially continuous groove and in the second circumferentially continuous groove, wherein the first annular segment, the second annular segment, the vane, and the curved segment define a first channel passing through the bearing.

13. The bearing of claim 12, wherein:
the vane includes a curved surface:
- facing in a circumferential direction around an axis of rotation of the bearing; and,
- defining a concave shape; and, the first annular segment, the second annular segment, the curved surface of the vane, and the curved segment of the cage define the first channel passing through the bearing.

14. The bearing of claim 12, wherein:
the vane includes a planar surface facing in a circumferential direction around an axis of rotation of the cage; and,
the first annular segment, the second annular segment, the planar surface of the vane, and the curved segment of the cage define the first channel passing through the bearing.

15. The bearing of claim 12, wherein:
the vane includes a portion extending radially outwardly past the first annular segment; and including a surface;
the surface:
- faces at least partly in a radially outer direction orthogonal to an axis of rotation of the bearing; and,
- forms at least one curve disposed in the first circumferentially continuous groove; and,
- the portion of the vane, the first annular segment, the outer ring, and the ball define a second channel passing through the bearing.

16. The bearing of claim 12, wherein:
the vane includes a portion extending radially inwardly past the second annular segment; and including a surface;
the surface:
- faces at least partly in a radially inner direction orthogonal to an axis of rotation of the bearing; and,
- forms at least one curve disposed in the second circumferentially continuous groove; and,
- the portion of the vane, the second annular segment, the inner ring, and the ball define a second channel passing through the bearing.

17. The bearing of claim 12, wherein:
the curved segment forms a concave shape facing in a first axial direction parallel to an axis of rotation of the bearing; and,
- the vane includes an axial end extending past the outer ring in the first axial direction; or,
- the vane includes an axial end extending past the outer ring in a second axial direction, opposite the first axial direction.

18. A method of pumping a lubricating fluid through a bearing including an inner ring with a first circumferential groove, an outer ring with a second circumferential groove, a cage radially disposed between the inner ring and the outer ring and including a first annular segment, a second annular segment radially inward of the first annular segment, a curved segment and a vane connected to the first annular segment and the second annular segment, and a ball disposed in the first circumferential groove and the second circumferential groove, and the curved segment including a pair of terminal ends extending towards each other such that the curved segment is configured to retain the ball, the method comprising:
- rotating the bearing in a first circumferential direction around an axis of rotation of the bearing;
- contacting a lubricating fluid with the vane; and,
- pumping, with the vane, the lubricating fluid through the bearing via a first channel in the cage, the first channel defined by the first annular segment, the curved segment, the second annular segment, and a first surface of the vane.

19. The method of claim 18, further comprising:
pumping, with the vane, the lubricating fluid through the bearing via a second channel formed by:
- the first annular segment, the first surface of the vane, the outer ring, and the ball; or,
- the second annular segment, the first surface of the vane, the inner ring, and the ball; or,
- the first annular segment, a second surface of the vane, the outer ring, and the ball; or,
- the second annular segment, a second surface of the vane, the inner ring, and the ball.

20. The method of claim 18, wherein:
the first surface of the vane is concave; or,
the first surface of the vane is planar.

* * * * *